United States Patent [19]
Martel et al.

[11] 3,905,965
[45] Sept. 16, 1975

[54] PROCESS OF TOTAL SYNTHESIS OF CEPHALOSPORIN DERIVATIVES AND INTERMEDIATES

[75] Inventors: Jacques Martel, Bondy; René Heymes, Romainville, both of France

[73] Assignee: Roussel-UCLAF, Paris, France

[22] Filed: Oct. 16, 1972

[21] Appl. No.: 297,776

Related U.S. Application Data

[60] Division of Ser. No. 81,539, Oct. 16, 1970, Pat. No. 3,708,477, which is a continuation-in-part of Ser. No. 836,975, June 26, 1969, abandoned.

[30] Foreign Application Priority Data
Oct. 17, 1969  France .............................. 69.35596
Oct. 22, 1969  France .............................. 69.36248

[52] U.S. Cl. ... 260/243 R; 260/243 C; 260/247.5 F; 260/326.2; 260/326.47; 260/326.5 S; 260/326.5 L; 260/465 D; 260/471 A; 260/583 CC; 424/246
[51] Int. Cl.²........................................ C07D 279/04
[58] Field of Search ..................... 260/243 C, 243 R

[56] References Cited
UNITED STATES PATENTS
3,642,788  2/1972  Heymes et al. ................. 260/243 C
3,658,802  4/1972  Heymes et al. ................. 260/243 C

*Primary Examiner*—Nicholas S. Rizzo
*Assistant Examiner*—Mary C. Vaughn
*Attorney, Agent, or Firm*—Hammond & Littell

[57] ABSTRACT

A 1,3-thiazine compound having the formula

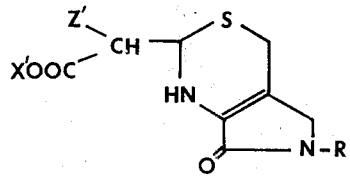

wherein x' is selected from the group consisting of hydrogen, lower alkyl and phenyl lower alkyl, R' is selected from the group consisting of hydrogen, lower alkyl, phenyl, phenyl lower alkyl, lower alkyl phenyl, and Z' is selected from the group consisting of amino and tritylamino.

These compounds are useful as intermediates in the preparation of cephalosporin compounds.

4 Claims, No Drawings

PROCESS OF TOTAL SYNTHESIS OF CEPHALOSPORIN DERIVATIVES AND INTERMEDIATES

PRIOR APPLICATION

This application is a division of copending application Ser. No. 81,539, filed Oct. 16, 1970, now U.S. Pat. No. 3,708,477, which in turn is a continuation-in-part application of our copending, commonly assigned U.S. patent application Ser. No. 836,975, filed June 26, 1969 now abandoned.

OBJECTS OF THE INVENTION

An object of the invention is the development of a total synthesis of cephalosporin derivatives.

More particularly, it is an object of the invention to provide a process for the preparation of new racemic or optically active cephalosporine derivatives having the formula

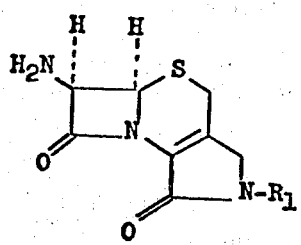

wherein $R_1$ is a member selected from the group consisting of hydrogen, alkyl, substituted alkyl, aryl and substituted aryl, which comprises the steps of a. reacting an amino acid having the formula $$R_1-NH-CH_2-CH_2-COOH$$

wherein $R_1$ has the above-assigned meaning with benzyl alcohol in the presence of an acid, b. condensing the acid salt of the benzyl ester thus obtained with an oxalate ester selected from the group consisting of dialkyl oxalates and diaralkyl oxalates to obtain the enol of a benzyl 2,3-dioxopyrrolidine-4-carboxylate having the formula

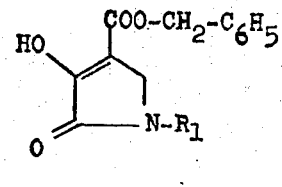

wherein $R_1$ has the above-assigned meaning, c. converting said carboxylate into the corresponding 4-carboxyl derivative having the formula

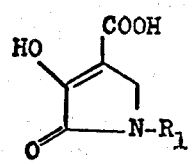

wherein $R_1$ has the above-assigned meaning, by hydrogenolysis, d. subjecting this compound to aminomethylation according to a Mannich reaction, thus obtaining an enol of a 2,3-dioxo-4-(R',R'')-amino-methyl-pyrrolidine having the formula

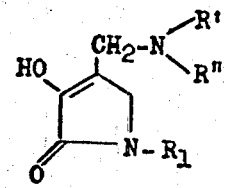

wherein R' and R'' are members selected from the group consisting of alkyl and aralkyl and, taken together with the nitrogen, a heterocycle and $R_1$ has the above-assigned meaning, e. reacting this compound with a thiocarboxylic acid having the formula $$Ac\ SH$$

where Ac represents the acyl of an organic carboxylic acid, to obtain an enol of a 2,3-dioxo-4-acyl-thiomethyl-pyrrolidine having the formula

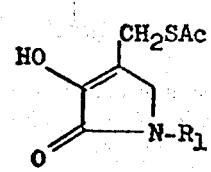

wherein Ac and $R_1$ have the above-assigned meanings, f. subjecting this compound to an acid alcoholysis to obtain a mercaptan having the formula

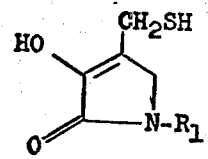

wherein $R_1$ has the above-assigned meaning, g. condensing the latter with an enamine having the formula

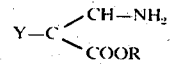

wherein R is selected from the group consisting of lower alkyl and aryl-lower alkyl, and Y is a member selected from the group consisting of an imido group and acylamino group, where acyl is the acyl of a lower organic carboxylic acid, thus obtaining a γ-lactam of 2-(α-R-oxy-carbonyl-α-Y-methyl)-5-aminomethyl-2,3-dihydro-1,3-thiazine-4-carboxylic acid having the formula

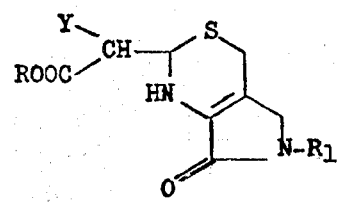

wherein R, R₁ and Y have the above-assigned meanings, h. reacting said lactam by a reaction selected from the group consisting of an exchange of functions using hydrazine, an acid hydrolysis and a hydrogenolysis, to obtain the corresponding γ-lactam having the formula

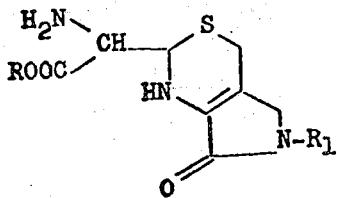

where R and R₁ have the above-assigned meanings, i. hydrolyzing the latter by the action of an acidic agent to form a γ-lactam of 2-(α-carboxy-α-aminomethyl)-5-aminomethyl-2,3-dihydro-1,3-thiazine-4-carboxylic acid having the formula

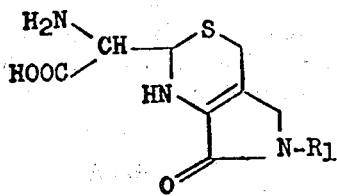

where R₁ has the above-assigned meaning, j. reacting this compound with a tritylating agent to obtain a γ-lactam of 2-(α-carboxy-α-tritylaminomethyl)-5-aminomethyl-2,3-dihydro-1,3-thiazine-4-carboxylic acid having the formula

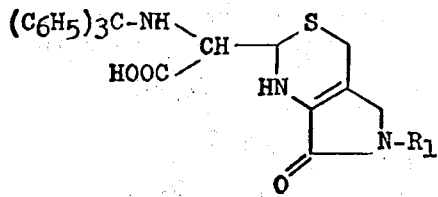

where R₁ has the above-assigned meaning, k. recovering the threo isomer of said acid, optionally converting the erythro isomer by treatment with an alkaline agent into the threo isomer, the -lactam l. lactamizing the threo isomer by the action of a carbodiimide, in the presence of a polar solvent and of a tertiary amine to obtain the γ-lactam of DL-6H,7H-cis-7-tritylamino-3-aminomethyl-ceph-3-eme-4-carboxylic acid having the formula

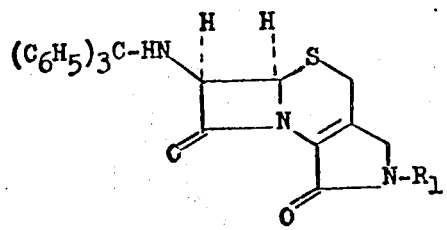

wherein R₁ has the above-assigned meaning, m. detritylating the latter by means of an acidic agent, and n. recovering said γ-lactam of 6H,7H-cis-7-amino-3-aminomethyl-ceph-3-eme-4-carboxylic acid having the formula

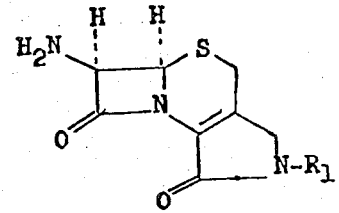

wherein R₁ has the above-assigned meaning, after optional resolution by means of an optically active organic carboxylic or sulfonic acid.

A further object of the invention is the development of

1. A process for the preparation of an enol of a 2,3-dioxo-4-(R',R'')-aminomethyl-pyrrolidine having the formula

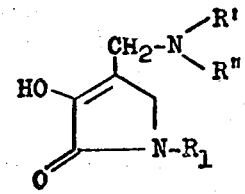

wherein R₁ is a member selected from the group consisting of hydrogen, alkyl, substituted alkyl, aryl and substituted aryl, and R' and R'' are members selected from the group consisting of alkyl and aralkyl and, taken together with the nitrogen, a heterocycle, which comprises the steps of subjecting an enol of a benzyl 2,-3-dioxo-pyrrolidine-4-carboxylate having the formula

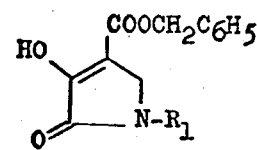

where R₁ has the above-assigned meaning, to a catalytic hydrogenation, to obtain the corresponding 4-carboxyl derivative having the formula

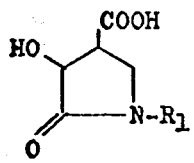

where $R_1$ has the above assigned meaning, subjecting said 4-carboxyl derivative to an aminomethylation according to a Mannich reaction and recovering said aminomethyl pyrrolidine.

2. A process for preparing the threo isomer of a γ-lactam of 2-(α-carboxy-α-tritylaminomethyl)-5-aminomethyl-2,3-dihydro-1,3-thiazine-4-carboxylic acid having the formula

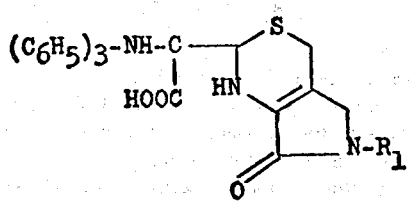

wherein $R_1$ is a member selected from the group consisting of hydrorgen, alkyl, substituted alkyl, aryl and substituted aryl, which consists essentially of converting the corresponding erythro isomer by the action of an alkaline agent into threo isomer.

A yet further object of the invention is the development of a process for the preparation of an acylated derivative of cephalosporin derivatives selected from the group consisting of racemic and optically-active derivatives having the formula

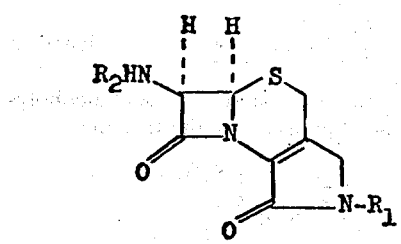

wherein $R_1$ is a member selected from the group consisting of hydrogen, alkyl, substituted alkyl, aryl and substituted aryl and $R_2$ represents the acyl of an organic acid, and their therapeutically-acceptable salts which consists essentially in the steps of acylating a cephalosporin derivative selected from the group consisting of racemic and optically-active derivatives having the formula

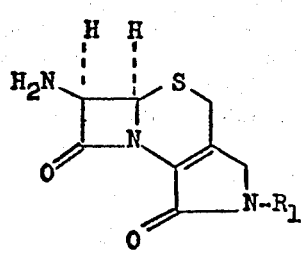

wherein R has the above-assigned meaning, by the action of an acylation agent derived from an organic acid and recovering said acylated derivative of cephalosporin derivatives.

A still further object of the present invention is the obtention of the novel intermediates as follows:

1. An enol of 2,3-dioxo-pyrrolidine having the formula

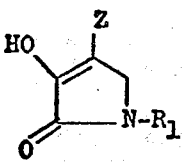

wherein $R_1$ is selected from the group consisting of hydrogen, alkyl, substituted alkyl, aryl and substituted aryl, and Z is a member selected from the group consisting of $-COOCH_2C_6H_5$, $-COOH$,

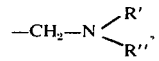

$-CH_2SAc$ and $-CH_2SH$, where R' and R'' are selected from the group consisting of alkyl and aralkyl, and, taken together with the nitrogen, a heterocycle, and Ac represents the acyl of an organic carboxylic acid.

2. A 1,3-thiazine derivative having the formula

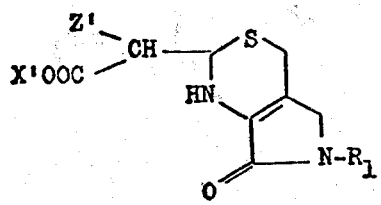

wherein X' is selected from the group consisting of hydrogen, lower alkyl and lower aralkyl, $R_1$ is selected from the group consisting of hydrogen, alkyl, substituted alkyl, aryl and substituted aryl, and Z' is selected from the group consisting of amino, tritylamino, imido and acylamino, where acyl is the acyl of a lower organic carboxylic acid.

3. A γ-lactam having the formula

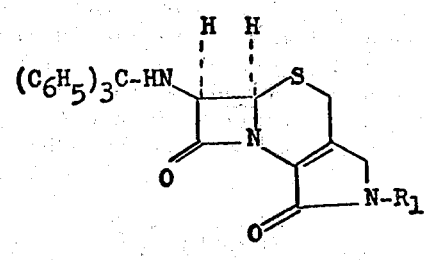

wherein $R_1$ is selected from the group consisting of hydrogen, alkyl, substituted alkyl, aryl and substituted aryl.

4. A cephalosporin derivative selected from the group consisting of racemic and optically active derivatives having the formula

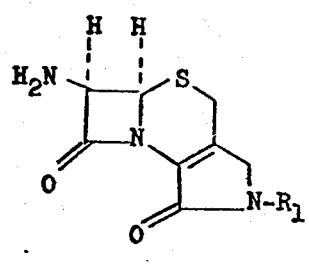

wherein R₁ is selected from the group consisting of hydrogen, alkyl, substituted alkyl, aryl and substituted aryl.

These and other objects of the invention will become more apparent as the description of the invention proceeds.

DESCRIPTION OF THE INVENTION

We have now discovered a process for the total synthesis of cephalosporin derivatives which achieves the above objects. This process involves the preparation of new racemic or optically-active cephalosporine derivatives having the general formula

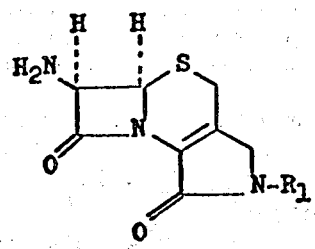

wherein R₁ is a member selected from the group consisting of hydrogen, alkyl, substituted alkyl, aryl and substituted aryl, which comprises the steps of
a. reacting an amino acid having the formula

R₁—NH—CH₂—CH₂—COOH wherein R₁ has the above-assigned meaning with benzyl alcohol in the presence of an acid.
b. condensing the acid salt of the benzyl ester thus obtained with an oxalate ester selected from the group consisting of dialkyl oxalates and diaralkyl oxalates to obtain the enol of a benzyl 2,3-dioxopyrrolidine-4-carboxylate having the formula

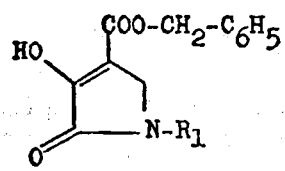

wherein R₁ has the above-assigned meaning,
c. converting said carboxylate into the corresponding 4-carboxyl derivative having the formula

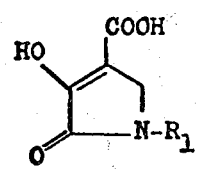

wherein R₁ has the above-assigned meaning, by hydrogenolysis, d. subjecting this compound to aminomethylation according to a Mannich reaction, thus obtaining an enol of a 2,3-dioxo-4-(R',R")-amino-methyl-pyrrolidine having the formula

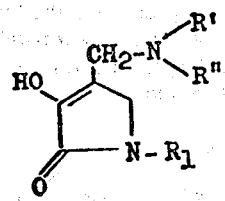

wherein R' and R" are members selected from the group consisting of alkyl and aralkyl and, taken together with the nitrogen, a heterocycle and R₁ has the above-assigned meaning,
e. reacting this compound with a thiocarboxylic acid having the formula

where Ac represents the acyl of an organic carboxylic acid, to obtain the enol of a 2,3-dioxo-4-acyl-thiomethyl-pyrrolidine having the formula

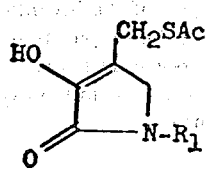

wherein Ac and R₁ have the above-assigned meanings,
f. subjecting this compound to an acid alcoholysis to obtain a mercaptan having the formula

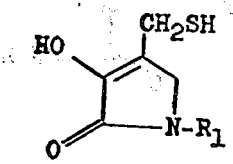

wherein R₁ has the above-assigned meaning,
g. condensing the latter with an enamine having the formula

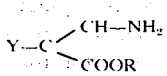

wherein R is selected from the group consisting of lower alkyl and aryl-lower alkyl, and Y is a member selected from the group consisting of an imido group and acylamino group, where acyl is the acyl of a lower organic carboxylic acid, thus obtaining a γ-lactam of 2-(α-R-oxy-carbonyl-α-Y-methyl)-5-aminomethyl-2,3-dihydro-1,3-thiazine-4-carboxylic acid having the formula

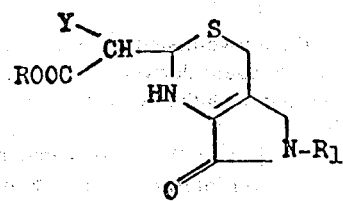

wherein R, R₁ and Y have the above-assigned meanings, h. reacting said lactam by a reaction selected from the group consisting of an exchange of functions using hydyrazine, an acid hydrolysis and a hydrogenolysis, to obtain the corresponding γ-lactam having the formula

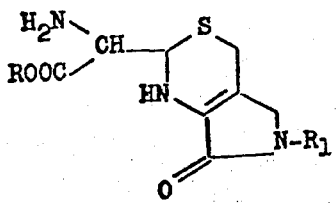

where R and R₁ have the above-asigned meanings, i. hydrolyzing the latter by the action of an acidic agent to form a γ-lactam of 2-(α-carboxy-α-aminomethyl-5-aminomethyl-2,3-dihydro-1,3-thiazine-4-carboxylic acid having the formula

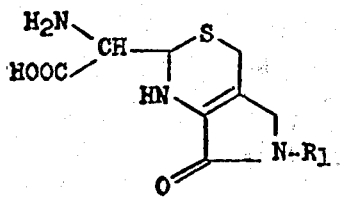

where R₁ has the above-assigned meaning, j. reacting this compound with a tritylating agent to obtain a γ-lactam of 2-(α-carboxy-α-tritylaminomethyl)-5-aminomethyl-2,3-dihydro-1,3-thiazine-4-carboxylic acid having the formula

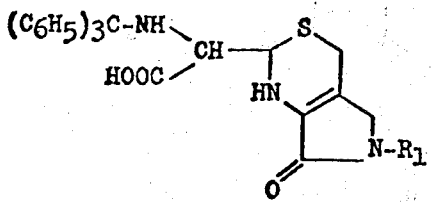

where R₁ has the above-assigned meaning, k. recovering the threo isomer of said acid, optionally converting the erythro isomer by treatment with an alkaline agent into the threo isomer, l. lactamizing the threo isomer by the action of a carbodiimide, in the presence of a polar solvent and of a tertiary amine to obtain the γ-lactam of DL-6H,7H-cis-7-tritylamino-3-aminomethyl-ceph-3-eme-4-carboxylic acid having the formula

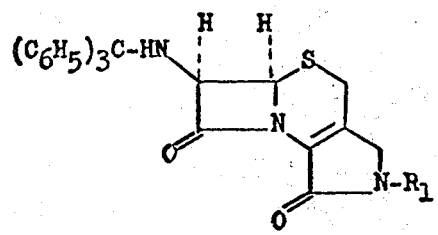

wherein R₁ has the above-assigned meaning, m. detritylating the latter by means of an acidic agent, and n. recovering said γ-lactam of 6H,7H-cis-7-amino-3-aminomethyl-ceph-3-eme-4-carboxylic acid having the formula

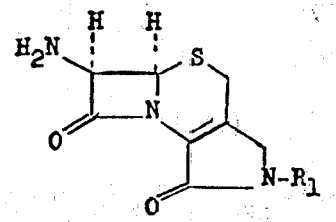

wherein R₁ has the above-assigned meaning, after optional resolution by means of an optically active organic carboxylic or sulfonic acid.

This process is illustrated by the flow diagram of Table I.

TABLE I

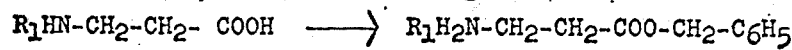

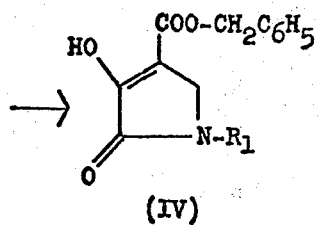

(IV)

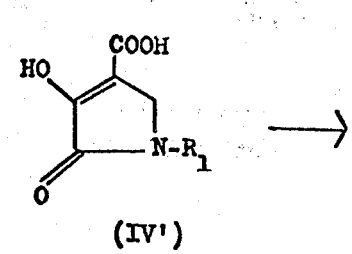

(IV')

TABLE I (Cont'd)
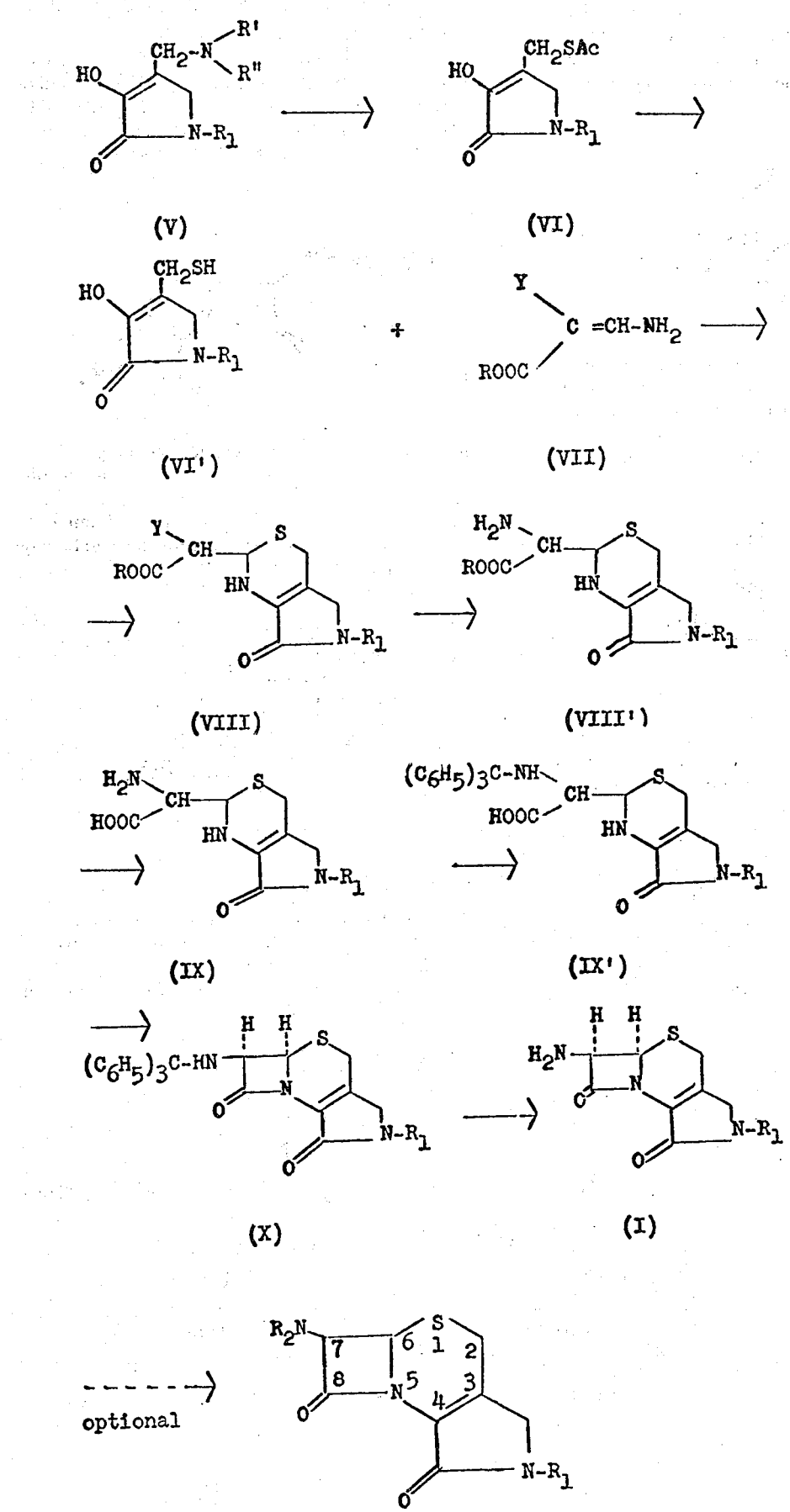

wherein R, R', R'', $R_1$, $R_2$, Ac and Y have the above-assigned meanings and X represents the anion of a mineral or sulfonic acid.

It must be noted that in this process the compounds VIII, VIII', IX and IX' possess two asymmetric carbons and can therefore exist in the form of threo isomer and erythro isomer. In fact, these two isomers have been observed. It is possible, as a function of the operative conditions, to vary the threo/erythro proportion and to obtain the preferred isomer. For example, the compound VIII can be obtained almost exclusively in the form of the erythro isomer, said erythro isomer of compound VIII giving rise in turn to a mixture of threo and erythro isomers of compound VIII'.

In order to convert VIII into IX', via the intermediate compounds VIII' and IX, it is not necessary, therefore, to isolate a pure isomer at each stage. The mixture of the two isomers can be used to conduct the following stage. However, only one of the two isomers of IX', the threo isomer, leads, by cyclization to the compound X possessing the desired 6H,7H-cis configuration of natural cephalosporin derivatives.

It is, therefore, necessary to recover IX' in the form of threo isomer. It has been found that IX' is always obtained, at least partially, in the form of the threo isomer, whatever the operative conditions may be. In addition, it has been shown that it is possible to isomerize the erythro form of IX' into the corresponding threo form as will be described later.

The process for preparing the derivatives of cephalosporin of general formula I, as defined above, includes more particularly two remarkable and unexpected aspects:

1. The hydrogenolysis of the enol of benzyl 2,3-dioxopyrrolidine-4-carboxylate of formula IV by catalytic hydrogenation which takes place without affecting the 3(4) double bond, this hydrogenolysis being followed by a decarboxylation in an aminomethylating medium.

It is advisable to note that in the particular case where $R_1$=H, no way of elimination of the carboxylic group (useful for the creation of an activated methylene in the first step) without breaking the heterocycle, was known until now. (See Southwick et al, J. Org. 21, 1086 [1956].)

2. The isomerization of the erythro form of the γ-lactam of 2-(α-carboxy-α-tritylamino-methyl)-5-aminomethyl-2,3-dihydro-1,3-thiazine-4-carboxylic acid of formula IX, into the threo form by means of an alkaline agent, which allows the access to an intermediate product having the structure of cephalosporanic derivatives of natural origin.

As has been indicated above, the starting material in the above process is β-alanine or a β-alanine derivative carrying the desired substituent $R_1$ on the nitrogen. It is likewise possible to introduce the $R_1$ (other than hydrogen) at the end of the synthesis, by reacting the compound of formula X ($R_1$=H) with an alkylating or aralkylating agent.

The process of the invention is advantageously performed as follows:

a. The reaction of benzyl alcohol with the starting product of formula II is effected in the presence of a sulfonic acid such as p-toluenesulfonic acid or methanesulfonic acid, or in the presence of a mineral acid, for example, sulfuric acid or a halohydric acid such as hydrochloric acid.

The starting product of formula II may be β-alanine ($R_1$=H) or a substituted β-alanine such as β-methylaminopropionic acid ($R_1$ = alkyl = methyl), β-benzylaminopropionic acid ($R_1$ = substituted alkyl = phenyl-lower alkyl = benzyl), β-phenylaminopropionic acid ($R_1$ = aryl = phenyl), β-(p-methoxyphenyl)-aminopropionic acid ($R_1$ = substituted aryl = lower alkoxyphenyl = methoxyphenyl), β-(p-methylphenyl)aminopropionic acid ($R_1$ = substituted aryl = lower alkylphenyl = methylphenyl), etc.

b. The condensation of the ester of formula III with dialkyl or diaralkyl oxalate is effected in the presence of an alkaline agent, for example, an alkali metal alcoholate, such as potassium or sodium t-butylate, or potassium or sodium benzylate. The oxalate is preferably a li-lower alkyl oxalate, such as diethyl oxalate, or a di-(phenyl-lower alkyl) oxalate such as dibenzyl oxalate.

c. The hydrogenolysis of benzyl 2,3-dioxopyrrolidine-4-carboxylate of formula IV is conducted in the presence of a hydrogenation catalyst based on palladium or platinum.

d. The aminomethylation to produce the compound of formula V is effected by the action of formaldehyde and of the hydrochloride of the chosen amine while operating in a hydrochloric media.

The amine used in the Mannich reaction is a secondary amine, for example, a di-lower alkylamine, such as dimethylamine or diethylamine, a di-aralkylamine, preferably a di-(phenyl-lower alkyl)-amine such as dibenzylamine, a (lower alkyl)-lower aralkyl amine such as methylbenzylamine, or a heterocyclic amine such as morpholine or pyrrolidine.

e. The thiocarboxylic acid utilized to react with the compound of formula V is preferably a thio-lower alkanoic acid, such as thio-acetic acid or thiopropionic acid, and the reaction is performed in the presence of the corresponding alkali metal thiocarboxylate such as the sodium or potassium thiocarboxylate.

f. The acid alcoholysis of the compound of formula VI is preferably effected by the action of a lower alkanol, such as methanol, in the presence of an acid agent, for example, a mineral acid such as hydrochloric acid or sulfuric acid, or a sulfonic acid, such as p-toluenesulfonic acid or methanesulfonic acid.

g. The alcoholysis reaction media containing the mercaptan of formula VI is, after neutralization at low temperature of between 0° and −70°C., reacted with an enamine of formula VII, such as the t-butylphthalimido-malonaldehydate enamine. The reacting mixture is then evaporated to dryness by distillation in vacuo and the residue thus obtained is taken up in anhydrous benzene. The reaction mixture is heated to reflux with optional azeotropic elimination of the water thus formed, and the thiazine of formula VIII is obtained under these conditions, essentially in the form of erythro isomer.

h. The acyl component of the Y group of the compound of formula VIII is split off by hydrazinolysis in the presence of an organic solvent, for example, a disubstituted amide such as dimethylformamide or a cyclic ether such as dioxan.

i. The hydrolysis of the compound of formula VIII' is effected by a mineral or organic acid, such as hydrochloric acid, hydrobromic acid, p-toluenesulfonic acid, a mixture of hydrobromic and acetic acids, or trifluoroacetic acid, in an anhydrous organic solvent, for example, benzene, toluene, ether, dioxan, nitromethane, or a polyhalogenated hydrocarbon such as chloroform or methylene chloride.

j. The tritylating agent utilized to protect the amino group of compound IX is preferably trityl chloride, and the reaction is conducted in the presence of a basic agent, preferably a tertiary amine such as triethylamine.

k. The isomerization of the erythro isomer of the γ-lactam of formula IX' into the threo isomer is realized by the action of an alkaline agent, for example, an alkali metal hydroxide, such as sodium hydroxide or lithium hydroxide, in an alkanol, preferably a lower alkanol such as methanol or ethanol.

l. The lactamization of the compound of formula IX' (threo isomer) is effected by the action of a dicycloalkylcarbodiimide such as dicyclohexylcarbodiimide or a di-lower alkyl-carbodiimide such as diisopropylcarbodiimide, in the presence of a polar solvent, for example, a nitroalkane, such as nitromethane, a disubstituted amide such as dimethylformamide, a sulfoxide such as dimethylsulfoxide, acetone or acetonitrile, and in the presence of a tertiary amine, for example, pyridine, a collidine or a dialkylaniline such as dimethylaniline, and optionally in the presence of an additional solvent such as methylene chloride or chloroform.

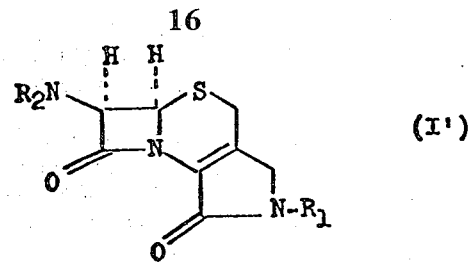

wherein $R_1$ is hydrogen, alkyl, substituted alkyl, aryl or substituted aryl and $R_2$ is the acyl of an organic acid, and their therapeutically-acceptable salts. This preparation consists in the step of acylating a compound of formula I by means of an acylating agent and recovering said acylated derivative of formula I'

Some of the compounds of formula I' are described and claimed in application Ser. No. 836,988, filed June 26, 1969 which is a continuation in part of Serial No. 697,589 filed Jan. 15, 1968, now abandoned, and some are being claimed herein. As indicated, the derivatives of formula I' are endowed with interesting antibiotic properties.

Among the preferred novel compounds of formula I' which are part of the present invention are compounds of the formula

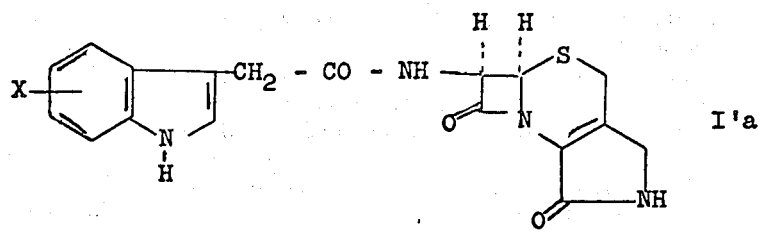

m. The detritylation of the compound of formula X and of the formula

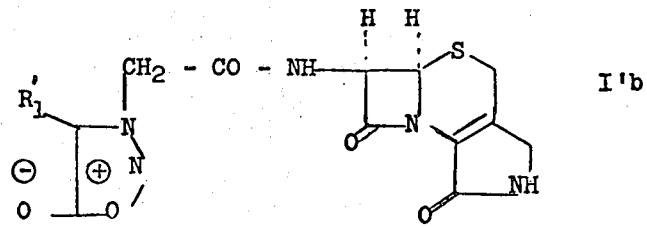

is effected by the action of a mineral or organic acid such as hydrochlorideacid, hydrofluoric acid, acetic acid or trifluoroacetic acid, in an organic solvent such as nitromethane, chloroform, methylene chloride or methanol.

n. The resolution of the γ-lactam of DL-6H,7H-cis-7-amino-3-aminomethyl-ceph-3-eme-4-carboxylic acid of formula I, if desired, is effected by means of an optically active organic carboxylic or sulfonic acid, such as tartaric, dibenzoyltartaric, camphosulfonic glutamic glumatic acids, the decomposition of the salt thus obtained being effected by means of a mineral base such as sodium or potassium hydroxide, or an organic base, for example, a tertiary amine such as triethylamine.

As has been already indicated, the new cephalosporin derivatives of formula I are useful as intermediates for the preparation of racemic or optically-active derivatives having the formula I' wherein X is selected from the group consisting of $NH_2$ and $—NO_2$ in the 4, 5, 6 and 7 position of the indole ring and $R_1'$ is selected from the group consisting of hydrogen, phenyl, nitrophenyl and aminophenyl and when X is an amino group and $R'_1$ contain an amino group, also the non-toxic, pharmaceutically acceptable acid addition salts thereof.

Specific compounds falling within the scope of formula I'a are the γ-lactam of DL 6H, 7H cis 7-(4'-nitroindoly-3'-acetamido)-3-aminomethyl-ceph-3-eme-4-carboxylic acid, the γ-lactam of DL 6H,7H cis 7-(5'-nitro-indolyl-3'-acetamido)-3-aminomethyl-ceph-3-eme-4-carboxylic acid, the γ-lactam of DL 6H, 7H cis 7-(6'-nitro-indolyl-3'-acetamido)-3-aminomethyl-ceph-3-eme-4-carboxylic acid, the γ-lactame of DL 6H, 7H cis 7-(7'-nitro-indolyl-3'-acetamido)-3-aminomethyl-ceph-3-eme-4-carboxylic acid, the γ-lactam of DL 6H, 7H cis 7-(4'-aminoindolyl-3'-acetamido)-3-aminomethylceph-3-eme-4-carboxylic acid and its hydrochloride, the γ-lactam of DL 6H, 7H cis 7-(5'-amino-indolyl-3'-acetamido)-3-aminomethyl-ceph-3-eme-4-carboxylic acid and its hydrochloride, the γ-lactam of DL 6H, 7H cis 7-(6'-aminoindolyl-3'-acetamido)-3-aminomethyl-ceph-3-eme-4-carboxylic acid and its hydrochloride and the γ-lactams of DL and L(+) 6H, 7H cis 7-(7'-amino-indolyl-3'-acetamido)-3-aminomethyl-ceph-3-eme-4-carboxylic acids and their hydrochlorides.

Among the suitable compounds of formula I'b are the γ-lactam of DL 6H, 7H cis 7-(4'-p-nitrophenyl-sydnone-3'-acetamido)-3-aminomethyl-ceph-3-eme-4-carboxylic acid, the γ-lactam of DL 6H, 7H cis 7-(4'-p-aminophenyl-sydnone-3'-acetamido)-3-aminomethyl-ceph-3-eme-4-carboxylic acid and its hydrochloride, the γ-lactam of DL 6H, 7H cis 7-(4'-m-nitrophenyl-sydnone-3'-acetamido)-3-aminomethylceph-3-eme-4-carboxylic acid, the γ-lactam of DL 6H,7H cis 7-(4'-m-aminophenyl-sydnone-3'-acetamido)-3-aminomethylceph-3-eme-4-carboxylic acid and its hydrochloride, the γ-lactam of DL 6H,7H cis 7-(sydnone-3'-acetamido)-3-aminomethylceph-3-eme-4-carboxylic acid and the γ-lactam of DL 6H,7H cis 7-(4'-phenyl-sydnone-3'-acetamido)-3-aminomethyl-ceph-3-eme-4-carboxylic acid.

While the preferred acid addition salt is the hydrochloride, any pharmaceutically acceptable acid can be used to form the addition salt. Examples of suitable acids are organic acids such as lactic acid, citric acid, tartaric acid, acetic acid, etc., or an inorganic acid such as sulfuric acid, nitric acid, etc.

The process for producing the novel compounds of formula I'a comprises condensing a (nitro-indolyl-3') acetic acid or a functional acid derivative thereof with the γ-lactam of 6H, 7H 7-amino-3-aminomethyl-ceph-3-eme-4-carboxylic acid as a racemate or in its optically active form to form the corresponding γ-lactam of 6H, 7H cis 7-(nitro-indolyl-3'-acetamido)-3-aminomethyl-ceph-3-eme-4-carboxylic acid which if desired can be catalytically hydrogenated in an acid or neutral medium to form the corresponding γ-lactam of 6H, 7H cis-7(amino-indolyl-3'-acetamide)-3-aminomethyl-ceph-3-eme-4-carboxylic acid which can be recovered in its free base form or as an acid addition salt.

In a preferred mode of the said process, the functional derivative of (nitro-indolyl-3')-acetic acid is an anhydride formed in situ with the said acid in the presence of a dialkyl or dicycloalkylcarbodiimide such as dicyclohexyl-carbodiimide or the acid halide or acid anhydride or a mixed anhydride.

The catalyst used for the reduction of the nitroderivative to the corresponding amino derivative is a platinum group metal such as palladium. The catalytic hydrogenation is preferably effectd in an acid medium and particularly by the addition of hydrochloric acid to obtain the hydrochloride salt of the amino derivative. The conversion of the acid addition salt into the free base can be effected by alkalinization thereof with an organic base such as trialkylamine or alkali metal carbonate or alkaline earth metal carbonate.

The process of the invention for the preparation of the compounds of formula I'b comprises condensing in the presence of a basic agent the γ-lactam of 6H, 7H cis 7-amino-3-aminomethyl-ceph-3-eme-4-carboxylic acid as a racemate or in its optically active form with a 4-R'₁-sydnone-3-acetic acid of the formula

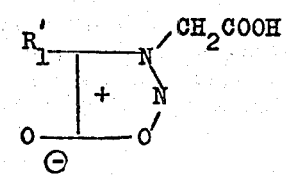

wherein R'₁ has the above definition other than aminophenyl or a functional derivative thereof to obtain the corresponding γ-lactam of formula I'b.

In a preferred mode of the said process, the functional derivative of 4 -R'₁-sydnone-3-acetic acid is an anhydride formed in situ with the said acid in the presence of a dialkyl or dicycloalkylcarbodiimide such as dicyclohexyl-carbodiimide or the acid halide or acid anhydride or a mixed anhydride.

The basic agent may be an alkali metal bicarbonate such as sodium bicarbonate or a trialkylamine such as triethylamine or pyridine. The condensation may be effected in the presence of an inert organic solvent such as acetone, chloroform, ethylene chloride, benzene, tetrahydrofuran, etc.

To form a compound of formula I'b wherein R₁ is aminophenyl, the corresponding nitrophenyl derivative of formula I'b is hydrogenated in the presence of a catalyst in an acid or neutral medium to obtain the corresponding amino derivative which can be salified with an organic or inorganic acid. The preferred method is hydrogen in the presence of a palladium base catalyst in the presence of an organic acid or inorganic acid such as hydrochloric acid and in a polar medium such as dimethylformamide.

The salification of the said γ-lactam may be with an inorganic acid such as a hydrogen halide, sulfuric acid, phosphoric acid, nitric acid or boric acid or with an organic acid such as formic acid, acetic acid, benzoic acid, salicylic or p-toluene sulfonic acid. It is also possible to salify the said γ-lactam with an acid possessing a therapeutic activity of its own such as an anti-inflammatory acid derivative of anthranilic acid or phenyl acetic acid or an amalgesic such as a substituted 4-(2'-hydroxycarbonylphenylamino)-quinoline or an antibiotic such as nalidixic acid, fusidic acid, colimycine methane sulfonic acid.

The starting 4-R'₁-sydnone-3-acetic acids may be prepared by cyclization with a dehydration agent of an N-nitroso-imino-diacetic acid of the formula

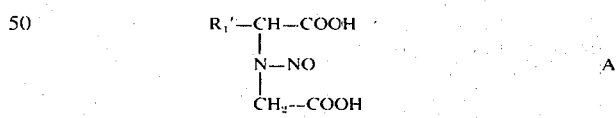

wherein R'₁ has the foregoing definition other than aminophenyl. Acetic acid anhydride is the preferred dehydration agent. An analogous method for the preparation of sydnone-3-acetic acid is described by Stewart [Chem. Ind., London, 1961, p. 1411].

The N-nitroso-imino diacetic acids of formula A other than N-nitroso iminoacetic acid can be prepared by a variety of methods. One method comprises reacting a benzaldehyde of the formula

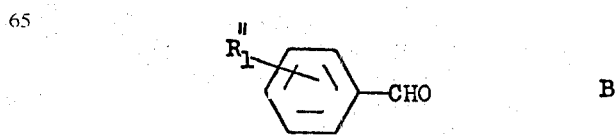

wherein R''₁ is hydrogen or a nitrogroup with the hydrochloride of ethyl glycocollate and potassium cyanide to form the hydrochloride of ethyl N-(α-phenyl-α nitrilomethyl)-glycocollate of the formula

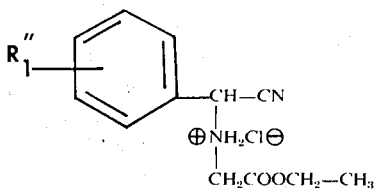  C and subjecting the latter to hydrolysis in a hydrochloric acid solution to form the diacid of the formula

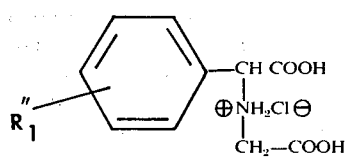  D which can be changed into the nitroso derivative by reaction with sodium nitrite.

Another method of preparing the starting materials comprises reacting a α-bromophenyl acetic acid of the formula

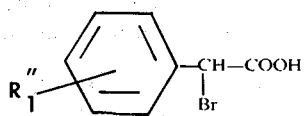  E with the hydrochloride of ethyl glycocollate to obtain the corresponding α-ethoxycarbonylmethylamino-α-phenyl acetic acid of the formula

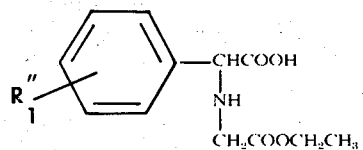  F and saponifying the latter with an alkaline agent to obtain a diacid of the formula

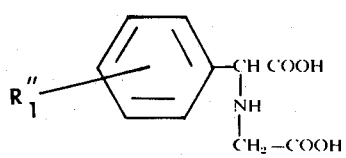  G which is treated with an alkali metal nitrite to form the corresponding nitroso derivative.

The following compounds are novel intermediates not described in the literature: α-ethoxycarbonylmethylamino-p-nitrophenylacetic acid; α-(p-nitrophenyl) imino-diacetic acid; DL 4-(p-nitrophenyl) sydnone-3-acetic acid; the hydrochloride of ethyl N-(α-m-nitrophenyl-α-nitrolomethyl)-glycocollate; DL α-(m-nitrophenyl) imino-diacetic acid; and DL 4-(m-nitrophenyl) sydnone-3-acetic acid.

The novel antibiotic compositions of the invention are comprised of an effective amount of at least one compound of formula I'a or I'b and a major amount of a pharmaceutical carrier. The usual useful daily dose for adults is 0.5 to 5.0 gm. The compositions may be in the form of injectable solutions or suspensions in ampoules or multidose flacons, in the form of tablets or coated tablets, syrups, suppositories, creams or pomades prepared in the usual fashion.

The composition may be used as therapeutics for the treatment of infections from gram positive bacteria such as septicemia, furonculoses, gastroenteritis, cholecystitis, abdomino-pelvic infection, burns and infected wounds.

The novel method of the invention for combatting bacterialinfections in warm-blooded animals comprises administering to warm-blooded animals suffering from a bacterial infection an effective amount of at least one compound of formula I'a or I'b. The said compounds can be administered parenterally, orally, rectally or externally or topically. The usual useful daily dose is 10 to 100 mg/kg.

The compounds of formula I'a and I'b have the advantage of manifesting at the same time a strong bacteriostatic activity and bactericidal activity against strains of penicillin sensitive and penicillin resistant Staphylococcus and above all are practically not deactivated in the presence of serum or proteins. Their minimum inhibitory concentrations are generally remarkably low in the presence or absence of serum. This strong activity appears unexpectedly in view of the results in Netherlands application No. 67.14888 for the 3-aminomethylderivatives described therein.

In the following examples there are described several preferred embodiments to illustrate the invention. However, it is to be understood that the invention is not intended to be limited to the specific embodiments.

EXAMPLE 1

Preparation of the γ-lactam of DL-6H,7H-cis-7-amino-3-aminomethyl-ceph-3-eme 4-carboxylic acid, I with $R_1 = H$ Stage A: p.-Toluene sulfonic acid addition salt of benzyl β-alaninate, III with $R_1 = H$ and X =p-toluenesulfonyl The following mixture:

| | |
|---|---|
| —β-alanine | 89 gm |
| —monohydrated p-toluene sulfonic acid | 210 gm |
| —benzyl alcohol | 450 cc |
| —carbon tetrachloride | 500 cc | was heated at azeotropic reflux for 5 hours, during which time about 45 cc of water was azeotropically separated. The reaction mixture was then reduced to small volume by distillation in vacuo. The solution was cooled and the product thus formed was crystallized from ether. After ice-cooling, the precipitate was suction-filtered and dried. 350 gm of crystals, M.P. 142°C were obtained (quantitative yield).

The product thus obtained is identical to that described by Nobuo Yzumiya et al., Nippon Kagaku Zasshi 78, 662 (1957).

Stage B: Benzyl 2,3-dioxo-pyrrolidine-4-carboxylate, IV with $R_1 = H$ 225 gm of potassium t-butylate were introduced into 900 cc of anhydrous benzene. Then 500 cc of benzyl alcohol were added. The mixture was cooled with an ice-methanol bath and, without exceeding 30°C, 351 gm of p-toluene sulfonic acid addition salt of benzyl β-alaninate were added.

On the other hand, 300 gm of benzyl oxalate were dissolved in 600 cc of hot benzene. The solution was allowed to return to ambient temperature and neutralized by the addition of 0.4 cc of triethylamine. This solution was admixed with the above-formed mixture still maintained in the refrigerating bath. The whole was then refluxed for 5 hours.

Benzene was eliminated by distillation in vacuo. Then 2 liters of water containing 15 cc of acetic acid, 1.5 liters of isopropyl ether and finally 110 cc of concentrated hydrochloric acid (until pH = 1 is obtained) were successively added. The mixture was ice-cooled and agitated for 2½ hours. The precipitate was suction-filtered, washed with water, with isopropyl ether and recrystallized by dissolution in dimethylformamide and addition of water. 130.5 gm (56% yield) of benzyl 2,3-dioxopyrolidine-4-carboxylate, m.p. 186°C, soluble in the alcohols, ether and acetone, insoluble in benzene and water, were obtained.

Analysis: $C_{12}H_{11}O_4N$ molecular weight = 233.24: Calculated: C,61.8%; H,4.76%; N,6.01%. Found: C,62%; H,5.1%; N,6.3%.

I.R. Spectrum:
Two maxima in the carbonyl region at 1729 cm$^{-1}$ and 1693 cm$^{-1}$;
Absorption in the associated OH/NH region;
Presence of monosubstituted aromatic ring.

As far as is known, this compound is not described in the literature.

Stage C: 2,3-dioxo-pyrrolidine-4-carboxylic acid, IV' with $R_1 = H$ a. Preparation of the hydrogenation catalyst
A suspension of 0.8 gm of animal charcoal in 4 cc of an aqueous solution containing 2% of palladium chloride was agitated under an atmosphere of hydrogen. After saturation, the catalyst was separated by suction-filtering while protected from the air, and washed several times with anhydrous dimethylformamide.

b. Hydrogenation
9.32 gm of benzyl 2,3-dioxo-pyrrolidine-4-carboxylate were dissolved in 50 cc of anhydrous dimethylformamide, and the catalyst prepared above was added. The whole was placed under an atmosphere of hydrogen and agitated, while cooling from time to time in order to avoid any appreciable rise in temperature. The mixture was filtered. 500 cc of isopropyl ether were added to the filtrate. The precipitate was suction-filtered and dried. There were obtained 4.618 gm (96% yield) of product which was used as such in the next step. For analysis, a portion of the product was dissolved in 6 volumes of dimethylsulfoxide and 4 volumes of methanol. After filtration, 4 volumes of methanol were added. The white precipitate of 2,3-dioxo-pyrrolidine-4-carboxylic acid, thus formed was suction-filtered and dried. Yield on purification: 60%.

The product appeared in the form of white crystals, poorly stable by reason of decarboxylation. It is soluble in dimethylsulfoxide and dimethylformamide, insoluble in isopropyl ether and in water.

I.R. Spectrum (in nujol) Absorption in the associated OH/NH region; Complex and strong absorption in the carboxyl region; Inflection at 1708 cm$^{-1}$; max. at 1677 cm$^{-1}$.

Analysis: $C_5H_5O_4N$ Calculated: C,41.96%; H,3.52%; N,9.79%. Found: C,41.7%; H,3.8%; N,9.9%.

As far as is known, this compound is not described in the literature.

Stage D; 2,3-dioxo-4-morpholino-methyl pyrrolidine hydrochloride, V with R' + R'' = $CH_2CH_2-O-CH_2-CH_2$ and $R_1 = H$ 2 drops of N hydrochloride acid were added to 10 cc of morpholine hydrochloride solution prepared by neutralization of 8.71 gm of morpholine by concentrated hydrochloric acid and addition of 50 cc of water. 2 cc of 30% formaldehyde and then 2.83 gm of 2,3-dioxo-pyrrolidine-4-carboxylic acid were added. The reaction mixture was heated to 60°–65°C under agitation for 30 hours, then evaporated to dryness. The residue was recrystallized from ethanol. 2.986 gm of product were obtained whcih was used as such in the next step.

For analysis, the product was dissolved in one volume of hot water and three volumes of ethanol were added. After ice-cooling, the precipitate was suction-filtered and there was obtained with a yield of 80%, 2,3-dioxo-4-morpholino-methyl-pyrrolidine hydrochloride, which appeared in the form of white crystals, slightly soluble in ethanol and ether, soluble in water.

Analysis: $C_9H_{15}O_3N_2Cl$ = 234.7: Calculated: C,46.06%; H,6.44%; N,11.94%; Cl, 15.11%. Found: C,45.8%; H,6.4%; N,11.8%; Cl,15.2%.

I.R. Spectrum: (in nujol)
Absorption bands at 3210 cm$^{-1}$ and from 3.6 to 4.1 μ
Triplet in the carbonyl region 1711 cm$^{-1}$; 1691 cm$^{-1}$; 1664 cm$^{-1}$.

As far as is known, this compound is not described in the literature.

2,3-dioxo-4-morpholino-methyl-pyrrolidine hydrochloride was also obtained starting from benzyl 2,3-dioxo-pyrrolidine-4-carboxylate without isolation of the free acid intermediate in the following way:

30.33 gm of benzyl 2,3-dioxo-pyrrolidine 4-carboxylate were introduced into 300 cc of dioxan containing 10% water, with slight heating to dissolve the product. 3 gm of animal charcoal and 1 cc of an aqueous solution of 20% palladium chloride were then added and the whole was placed under an atmosphere of hydrogen and agitated very energetically. After 1 hour 40 mins. 2,700 cc of 4-morpholino-methyl-pyrrolidine hyrochloride were added. The reaction mixture was agitated at ambient temperature for 3 hours and a half, some ethyl ether being added after half-an-hour in order to suppress the froth which formed. 80 cc of concentrated hydrochloric acid were then added (till pH-1) and the excess thioacetic acid was eliminated by evaporation in vacuo.

The reaction mixture was filtered and the filtrate was conserved. The precipitate was washed with water, then dissolved in 150 cc of hot chloroform. After decantation of the water adhering to the precipitate, this aqueous phase was extracted with chloroform. The combined organic phases were dried on sodium sulfate and evaporated to dryness in vacuo. The residue was triturated with ethyl ether. 25 gm (67% yield) of 2,3-dioxo-4-acetyl-thiomethyl-pyrrolindine, m.p. 136° C, were obtained.

The above-obtained conserved filtrate was extracted with chloroform. The extracts were dried on sodium sulfate, filtered and evaporated to dryness in vacuo. The residue was dissolved in a mixture of 10 cc of ethyl acetate and 10 cc of ethyl ether. After ice-cooling overnight, the precipitate was suction-filtered and there were obtained 2.5 gm of product identical to that of the first yield. Total yield: 72.5%.

The product may be used without another purification for the next step of the synthesis.

For analysis, a part of the product was recrystallized from ethyl acetate, the melting point remaining constant. The product appears in the form of white crystals, soluble in water, slightly soluble in ethyl ether and ethyl acetate.

Analysis. $C_7H_9O_3NS$ = 187.21: Calculated: C,44.91%; H,4.85%; N,7.49%; S,17.13%. Found: C,44.7%; H,4.9%; N,7.6: S,17.1%.

U.V. Spectrum a. in ethanol-0.1 N hydrochloric acid Max. 225 mµ; $E_1$1% cm = 666.

b. in ethanol-0.1 N Sodium hydroxide Max. 251 mµ; $E_{1cm}^{1\%}$ = 564.

I.R. Spectrum (in chloroform)
Carbonyl: Max. at 1689 $cm^{-1}$;
NH thin band at 3460 $cm^{-1}$;
OH max. at about 3210 $cm^{-1}$.

As far as is known, this compound is not described in the literature.

Stage F: γ-lactam of 2-[α-t-butoxy-carbonyl-α-phthalimido-methyl]-5-aminomethyl-2,3-dihydro-1,3-thiazine-4-carboxylic acid, VIII with R = t-Bu, $R_1$ = H and Y = phthalimido 18.72 gm of 2,3-dioxo-4-acetylthiomethyl-pyrrolidine were dissolved in 300 cc of a methanol solution of 5% p-toluene sulfonic acid and the solution was refluxed for 2½ hours. The mixture was allowed to return to ambient temperature and then cooled to −50°C. 39.5 cc of a 2 N ammonium acetate solution is methanol were then added drop by drop. Then 30 gm of t-butyl phthalamido malonaldehydate enamine were added and the mixture was agitated, both under an atmosphere of nitrogen, for a few minutes at ambient temperature. The solvents were eliminated by distillation in vacuo. The residue was taken up with anhydrous benzene and heated to azeotropic reflux, with continuous separation of water, for twelve hours. The residue, consisting essentially of erythro isomer, was taken up with 200 cc of methanol. The crystals were suction-filtered. The product was purified by successive triturations with water, methanol, ethyl ether, dissolution in dimethylformamide and addition of methanol.

16.6 gm (40% yield) of essentially the erythro isomer of the γ-lactam of 2-[α-t -butoxy-carbonyl α-phthalimido-methyl]-5-aminomethyl-2,3-dihydro-1,3-thiazine-4-carboxylic acid, m.p. 250°C, were obtained, which appeared in the form of white crystals soluble in the methanol-chloroform mixture, slightly soluble in pure methanol, insoluble in benzene and ethyl ether.

Analysis: $C_{20}H_{21}O_5N_3S$ = 415.47: Calculated: C,57.8%; H,5.10%; N,10.11%; S,7.72%. Found: C,57.7%; H,5.4%; N,9.9%; S,7.9%.

As far as is known, this compound is not described in the literature.

Stage G: γ-lactam of 2-[α-t-butoxy-carbonyl-α-aminomethyl hydrochloride]-5-amino-methyl-2,3-dihydro-1,3-thiazine-4-carboxylic acid, VIII' (hydrochloride) with R = t-But, $R_1$ = H 16.6 gm of γ-lactam of 2-(α-t-butoxy-carbonyl-α-phthalimido-methyl)-5-aminomethyl-2,3-dihydro 1,3-thiazine-4-carboxylic acid were introduced in 32 cc of dimethylformamide. Then 22 cc of 2 M solution of hydrazine hydrate in dimethylformamide were added very slowly, while agitating under an atmosphere of nitrogen. The whole was agitated for 30 minutes at ambient temperature. Then 44 cc of N hydrochloric acid were added in a period of 30 minutes. The mixture was agitated for 30 minutes, then ice-cooled and filtered. The filtrate was evaporated to dryness in vacuo and the residue, dissolved in 30 cc of water, was treated with animal charcoal. The solution was filtered, evaporated to dryness and the residue was crystallized from methanol and washed with ethyl ether. There were obtained 12.5 gm (97% yield) of product consisting of a mixture of threo and erythro isomers. This mixture may be used as such for the next step of the synthesis.

The constituents of the threo and erythro stereoisomeric mixture of the γ-lactam of 2-[α-t-butoxy-carbonyl-α-aminomethyl hydrochloride]-5-aminomethyl-2,3; -dihydro-1,3-thiazine-4-carboxylic acid can also, if desired, be separated by fractional crystallization from methanol containing 20% water where the erythro isomer is the least soluble. The threo and erythro stereoisomeric hydrochlorides can hardly be distinguished by their I.R. or U.V. spectral characteristics, but in thin layer chromatography, the erythro form appears the most mobile (Kieselgel GF 254 3/10 mm; eluting mixture = ethyl acetate 60%, ethanol 20%, water 20%).

For each pure stereoisomeric hydrochloride (or their mixture) dissolution in the volume vlaume of an aqueous solution of sodium bicarbonate liberates the free base (or the mixture of free bases) which can be extracted with ethyl acetate.

As far as is known, all of these compounds are not described in the literature.

Stage H: γ-lactam of 2-(α-carboxy-α-tritylamino)-methyl-5-amimomethyl-2,3-dihydro-1,3-thiazine-4-carboxylic acid 1. γ-lactam of 2-(α-carboxy-α-aminomethyl)-5-aminomethyl-2,3-dihydro-1,3-thiazine-4-carboxylic acid, IX, with $R_1$ = H.

12.88 gm of the mixture of threo and erythro isomers of the γ-lactam of 2-(α-t-butoxy-carbonylα-aminomethyl hydrochloride) -5-aminomethyl-2,3-dihydro-1,3-thiazine-4-carboxylic acid were introduced into 320 cc of nitromethane. The mixture saturated with gaseous hydrochloric acid and cooled by an ice-methanol mixture. A current of gaseous hydrochloric acid was poured into the suspension thus formed for fifty minutes. The hydrochloric acid was then eliminated in vacuo.

The suspension of the mixture of threo and erythro isomers of the γ-lactam of 2-(α-carboxy-α-aminomethyl)-5-aminomethyl-2,3-dihydro-1,3-thiazine-4-carboxylic acid was used as such in the next step. The corresponding threo and erythro stereoisomers may also be obtained starting from their corresponding starting materials.

As far as is known, these compounds are not described in the literature.

2. γ-lactam of 2-(α-carboxy-α-tritylaminomethyl)-5-aminomethyl-2,3-dihydro-1,3-thiazine-4-carboxylic acid, IX', with $R_1$ = H 28 cc of triethylamine and 24 gm of trityl chloride in 80 cc of methylene chloride were added to the above-obtained mixture, while ice-cooling under an atmosphere of nitrogen. After one night at ambient temperature under nitrogen the mixture was evaporated to dryness in vacuo. The residue was dissolved in a mixture of 200 of methanol and 200 cc of methylene chloride. 16 cc of acetic acid were added. The mixture was concentrated to half its volume, agitated for half an hour at ambient temperature and suction-filtered. The precipitate was dried and 7.161 gm (38% yield) of tritylated product (practically pure threo form) were collected of the γ-lactam of 2-(α-carboxy-α-tritylaminomethyl)- 5-aminomethyl-2,3-dehydro-1,3-thiazine-4-carboxylic acid.

As far as is known, this compound is not described in the literature.

3. Isolation of the erythro isomer

The mother liquor obtained above was treated with animal charcoal, filtered and evaporated to dryness in vacuo on a water bath. The residual oil was dissolved in 200 cc of ethyl ether. 20 cc of water were added drop by drop. The whole was agitated under an atmosphere of nitrogen for 4 hours at ambient temperature, and then suction-filtered. The precipitate was washed with ethyl ether, then with water and 8.368 gm of tritylated product, (erythro form containing a little of the threo isomer) were obtained.

As far as is known, this compound is not described in the literature.

4. Isomerization of the erythro form into threo form 8.368 gm of the tritylated derivative(erythro form) were suspended in 170 cc of methanol. After cooling to 10°C, 11.8 cc of aqueous 3.4 N lithium hyroxide were added. After 3 minutes at ambient temperature, acetic acid (about 2.5 cc) was added until a slightly acid pH was obtained. The whole was then heated at 60°C for 10 minutes, and then su suction-filtered. The precipitate was washed with methanol and 4.728 gm of the tritylated derivative (threo form) were obtained.

The mother liquor was treated, on the other hand, with animal charcoal and filtered. The insoluble part was washed with methanol. The washes were added to the filtrate and the whole was evaporated to dryness in vacuo. The residue was dissolved in 10 cc of ethyl ether. 1 cc of acetic acid and 1 cc of water were added. After 2 hours at ambient temperature, the mixture was suction-filtered and there was obtained 1.673 gm of erythro form of the tritylated derivative which was isomerized as described above to obtain a further 0.887 gm of threo derivative.

5. Purification of the threo isomer

The different crops (12.77 gm) of the threo product were combined and introduced into 10 cc of methanol. The mixture was heated to reflux and filtered. The precipitate was washed with ether, then dried, thus obtaining 12.13 gm (95% yield) of product which may be used as such for the next step of the synthesis.

The product appears in the form of colorless crystals, melting with decomposition at about 240° C (while the erythro isomer melts with decomposition at about 220°C).

It is soluble in aqueous alcohol, slightly soluble in dimethylformamide and dimethylsulfoxide, insoluble in the hydrophobic organic solvents.

Analysis: $C_{27}H_{25}N_3SO_3$ = 471.55: Calculated: C,68.77%; N,8.91%; S,6.80%; H, 5.35%. Found: C,69.0%; N,8.6%; S,7.1%; H, 5.3.

Stage I: γ-lactam of DL6H,7H-cis-7-tritylamino 3-aminomethyl-ceph-3-eme 4-carboxylic acid, X, with $R_1 = H$.

14.15 gm of γ-lactam of 2-(α-carboxy-α-tritylamino)-methyl-5-aminomethyl-2,3-dihydro-1,3-thiazine-4-carboxylic acid, threo form, were suspended in 140 cc of anhydrous pyridine placed under an atmosphere of nitrogen. 10.2 gm of dicyclohexyl carbodiimide were added. After agitation for 5 minutes, 300 cc of anhydrous methylene chloride, then 300 cc of anhydrous nitromethane were added. The resulting white suspension was maintained in the dark at ambient temperature for 65 hours. The dicyclohexylurea which had crystallized was suction-filtered and washed with methylene chloride. The filtrate and washings were concentrated in vacuo until one-fourth of volume, treated with animal charcoal, filtered and evaporates to dryness in vacuo. The residue was crystallized by triturating in ether and suction-filtering. The mother liquors of washing steps were conserved.

The crystalline product was dissolved in 30 cc of ethyl acetate, and precipitated by the addition of 2 cc of water. The mixture was diluted with 35 cc of ethyl ether and suction-filtered to obtain 9.3 gm of colorless crystals, solvated with a half mol of water, melting at about 200°C (with decomposition).

By addition of water to the conserved ethereal solution obtained above, a further 0.18 gm of product identical to that of the first yield was recovered.

The product obtained may be used as such for the next step of the synthesis.

For analysis, it was recrystallized from methyl acetate and anhydrous γ-lactam of DL-6H,7H-cis-7-tritylamino-3-aminomethyl-ceph-3-eme-4-carboyxlic acid was obtained, m.p. about 240°C with decomposition.

Analysis of the product solvated with one-half mol of water. $C_{27}H_{23}O_2N_3S$, ½ $H_2O$; molecular weight = 462.5: Calculated: C, 70.16%; H, 5.23%; N, 9.08%; S, 6.93%. Found: C, 69.9%; H, 5.5%; N, 9.1%; S, 6.8.

I.R. Spectrum in chloroform:
free NH 3440 cm$^{-1}$ + associated NH;
β-lactam 1777 cm$^{-1}$;
γ-lactam 1698 cm$^{-1}$;
C = C — 1663 cm$^{-1}$.
Presence of aromatic rings.

U.V. Spectrum:
1. in ethanol Inflex. at about 226 mμ, $E_{1cm}^{1\%} = 424$; 254 mμ, $E_{1cm}^{1\%} = 125$; 259–260 mμ, $E_{1cm}^{1\%} = 121$.

2. in ethanol containing 0.1 N hydrochloric acid. Inflex. at about 225–6 mμ, $E_{1cm}^{1\%} = 425$; 253–4 mμ, $E_{1cm}^{1\%} = 127$; 259–60 mμ, $E_{1cm}^{1\%} = 123$.

3. in ethanol containing 0.1 N sodium hydroxide. λmax. 260 mμ, $E_{1cm}^{1\%} = 78$.

Nuclear magnetic resonance: 60 Mhz in $CDCl_3$.

The coupling constant between the two protons of the β-lactam cycle is 5 Hz, which confirms the cis configuration of the two hydrogens.

As far as is known, this compound is not described in the literature.

Stage J: γ-lactam of DL-6H,7H-cis-7-amino-3-aminomethyl-ceph-3-eme -4-carboxylic acid, I, with $R_1 = H$ 6 gm of γ-lactam of DL-6H,7H-cis-7-tritylamino-3-aminomethyl-ceph-3-eme 4-carboxylic acid were introduced into 42 cc of nitromethane saturated with gaseous hydrochloric acid at a temperature of 20° C. After agitation at ambient temperature for 10 minutes, the hydrochloric acid was eliminated in vacuo, and 60 cc of ethyl ether were added. The mixture was suction-filtered and the precipitate washed with ethyl ether and dried. The hydrochloride thus obtained was introduced into 30 cc of ethanol under an atmosphere of nitrogen. 2.3 cc of triethylamine were quickly added while agitating and the agitation was continued for 10 minutes. The mixture was ice-cooled and suction-filtered. The precipitate was washed with ethanol, then with ethyl ether and 2.6 gm (93% yield) of a product was obtained usable, without other purification, for acylation or for resolution.

For analysis, the hydrochloride product was recrystallized from water and the free base was obtained by addition of triethylamine.

The γ-lactam of DL-6H,7H-cis-7-amino-3-aminomethyl-ceph-3-eme-4-carboxylic acid is soluble in water, dimethylsulfoxide and dimethylformamide, slightly soluble in ethanol and insoluble in ethyl ether.

Analysis: $C_8H_9O_2N_3S$ = 211.24: Calculated: C, 45.49%; H, 4.30%; N, 19.90%; S, 15.18%. Found: C, 45.7%; H, 4.5%; N, 20.0%; S, 14.9%.

I.R. Spectrum in nujol:
β-lactam at 1754 $cm^{-1}$;
γ-lactam at 1684 $cm^{-1}$;
double bond C = C — 1647 $cm^{-1}$;
and several other absorptions in the OH and HN regions.

As far as is known, this compound is not described in the literature.

EXAMPLE 2

Resolution of the γ-lactam of DL-6H,7H-cis-7-amino-3-aminomethyl-ceph-3-eme 4-carboxylic acid 3 gm of pure D(−)-tartaric acid were dissolved in 15 cc of water. 3.17 gm of the γ-lactam of DL-6H,7H-cis-7-amino-3-aminomethyl-ceph-3-eme 4-carboxylic acid, then 15 cc of methanol were added to the solution. The tartrate crystallized. 15 cc of methanol were added and the mixture was agitated for 5 minutes and suction-filtered. The precipitate was washed with methanol, then with ethyl ether. 2.16 gm (80% yield) of the diastereoisomeric salt, $[\alpha]_D^{20}$ = + 77 ± 1.5° (c = 1%, water) were obtained.

The tartrate obtained above was triturated for five minutes in 17 cc of ethanol, then 1.9 cc of triethyl amine was added drop by drop. The mixture was agitated at ambient temperature for 15 minutes and suction-filtered. The precipitate was washed with ethanol and with ethyl ether and 1.2 gm of γ-lactam of L(+)-6H,7H-cis-7-amino 3-aminomethyl-ceph-3-eme 4-carboxylic acid, $[\alpha]_D^{20}$ = + 226° ± 3° (c = 1%, water) was obtained.

As far as is known, this compound is not described in the literature.

The other isomer can be recovered from the mother solution of the above tartrate as follows:

The mother solution was admixed with triethylamine until a slightly alkaline pH was obtained. The mixture was evaporated at 35°C in vacuo. The residue was introduced into 20 cc of ethanol, and the mixture was suction-filtered. The precipitate was washed with ethanol and with ethyl ether. 1.48 gm of γ-lactam of D(−)-6H,7H-as-7-amino-3-aminomethyl-ceph-3-eme 4-carboxylic acid was obtained.

As far as is known, this compound is not described in the literature.

Examples of acylation of the compounds of formula I and Preparation of compounds of formula I'

EXAMPLE 3:

Preparation of the γ-lactam of DL-6H, 7H-cis-7-(o.-carboxyl-phenylacetamido)-3-aminomethyl-ceph-3-eme 4-carboxylic acid.

106 mg of γ-lactam of DL-6H,7H-cis 7-amino-3-aminomethyl-ceph-3-eme-4-carboxylic acid were introduced into 1 cc of dimethylformamide. 125 mg of homophthalic anhydride were added, and the mixture was agitated at ambient temperature for one night. Then 10 cc of water were added, and the mixture was agitated for 5 minutes and suction-filtered. The precipitate was washed with water and dried. The product was taken up in 1 cc of dimethylsulfoxide. After filtration, 1 cc of methanol, then 1 cc of water were added to the filtrate which was then suction-filtered. The precipitate was washed with aqueous methanol and with ethyl ether and 120 mg (70% yield) of the γ-lactam of DL-6H,7H-cis-7-(o.-carboxyl-phenylacetamido)-3-aminomethyl-ceph-3-eme-4-carboxylic acid, melting above 260°C were obtained. It appears in the form of colorless crystals, soluble in dimethylformamide and dimethylsulfoxide as well as in aqueous alakalis, slightly soluble in the usual organic solvents.

Analysis: $C_{17}H_{15}O_5N_3S$ = 373.37: Calculated: C, 54.68%; H, 4.05%; N, 11.26%; S, 8.58%. Found: C, 54.9%; H, 4.2%; N, 11.0%; S, 8.7%.

I.R. Spectrum in nujol:
Bands at 1767 $cm^{-1}$—β-lactam
1678 $cm^{-1}$ 1704–1658 $cm^{-1}$—γ-lactam + amide + acid
1532 $cm^{-1}$ — 2nd amide
absorption in the associated OH/NH region; OH of aromatic acid.

EXAMPLE 4

Preparation of the γ-lactam of DL-6H, 7H-cis-7-(p.-sulfonyl-phenylacetamido)-3-aminomethyl-ceph-3-eme-4-carboxylic acid 106 mg of γ-lactam of DL-6H,7H-cis-7-amino-3-aminomethyl-ceph-3-eme-4-carboxylic acid were suspended with agitation in 1 cc of dimethylformamide. 277 mg of sodium salt of p.-sulfonyl-phenylacetic acid and 115 mg of dicyclohexylcarbodiimide were added. The reaction mixture was agitated at ambient temperature for 2 hours. The thus-formed dicyclohexylurea was eliminated by filtration. Then 3 cc of dioxane were added and the mixture was suction-filtered and the precipitate was recrystallized from a water-dioxane mixture.

Taking into account the solvation of the product with 2 mols of dioxane, the product (162 mg) was obtained with a 70% yield. It loses 18.6% of its weight when held at 100°C in vacuo. The values of the microanalysis below have been calculated for a solvation with one-half mol of dioxane.

Analysis: $C_{18}H_{18}O_7N_3S_2Na$ molecular weight = 475.46: Calculated: C, 45.44%; H, 3.82%; N, 8.84%; S, 13.48%. Found: C, 45.1%; H, 4.0%; N, 8.8%; S, 13.2%.

I.R. Spectrum in nujol:
Bands at 1781 $cm^{-1}$—β-lactam
1698 and 1655 $cm^{-1}$—C=O of an amide
1560 $cm^{-1}$ — 2nd amide
absorption in the associated OH/NH region.

EXAMPLE 5

Preparation of the γ-lactam of DL-6H, 7H-cis-7-(p.-amino-phenylacetamido-3-amino-methyl-ceph-3-eme-4-carboxylic acid 755 mg of p.-amino-phenylacetic acid were introduced into 13.5 cc of an aqueous N solution of diethylamine. 2.25 gm of trityl chloride were added and the mixture was agitated for half an hour. After decantation, 10 cc of ethyl acetate and 5 cc of N hydrochloric acid were added and the mixture was extracted with ethyl ether. The extracts were evaporated to dryness in vacuo, and the residue was dissolved in ethyl acetate. Diethylamine was added and crystallization was induced by scratching. Ethyl ether was then added and the mixture was suction-filtered. The residue was introduced into an ethyl ether-water mixture, and acetic acid was added until the product dissolved. The organic phase was separated and washed with water, dried and filtered. The filtrate was concentrated to dryness in vacuo. The product was crystallized from petroleum ether and 1.15 gm (60% yield) of p.-tritylamino phenylacetic acid was obtained.

786 mg of p.-tritylamino phenylacetic acid were introduced into 8 cc of anhydrous methylene chloride under an atmosphere of nitrogen. 250 mg of carbodiimide were added and the mixture was agitated while cooling to 10°C for 1 hour. The urea was eliminated by filtration. The filtrate was evaporated to dryness and the residue which consisted of the anhydride of p.-tritylamino-phenylacetic acid was dissolved in 4 cc of dimethyl-formamide.

To the above solution, 106 mg of γ-lactam of DL-6H,7H-cis-7-amino-3-aminomethyl-ceph-3-eme-4-carboxylic acid were added and the mixture was agitated at ambient temperature overnight.

Methylene chloride was then added. The mixture was washed with water. The washings were extracted with ethyl ether. The organic phases were combined, dried and evaporated to a small volume in vacuo, without heating. Ethyl ether was added, and the precipitate was suction-filtered. The precipitate was washed with ethyl ether and 233 mg of γ-lactam of DL-6H,7H-cis-7-p.tritylamino-phenylacetamido-3-amino-methyl-ceph-3-eme-4-carboxylic acid were obtained.

10 cc of nitromethane were saturated with gaseous hydrochloric acid. After ice-cooling 1.045 gm of the above tritylated derivative was introduced thereto and the mixture was agitated for 5 minutes at ambient temperature. The excess hydrochloric acid was eliminated and the mixture was suction-filtered, thus obtaining 570 mg of product melting above 250°C. For purpose of purification 210 mg of this product were introduced into a dilute aqueous solution of hydrochloric acid. The mixture was neutralized by the addition of triethylamine and suction-filtered. The precipitate was washed with methanol, then with ethyl ether. 150 mg of γ-lactam of DL-6H,7H-cis-7-p.-amino-phenylacetamido-3-aminomethyl-ceph-3-eme-4-carboxylic acid were obtained. The product melted above 250°C and appeared in the form of straw-yellow crystals.

Analysis: $C_{16}H_{16}O_3N_4S=344.39$: Calculated: C, 55.8%; H, 4.7%; N, 16.26%; S, 9.3%. Found: C, 55.5%; H, 4.9%; N, 16.1%; S, 9.1%.

EXAMPLE 6

In an analogous way, by operating according to the above Example 5, there was obtained the γ-lactam of L(+)-6H,7H-cis-7-(p.-amino-phenylacetamido)-3-aminomethyl-ceph-3-eme-4-carboxylic acid, $[\alpha]D^{20} = +147° \pm 3.5°$ (c = 0.7%, dimethylformamide).

EXAMPLE 7

Preparation of the γ-lactam of L(+)-6H, 7H-cis-7-(2'-thienylacetamido)-3-aminomethyl-ceph-3-eme-4-carboxylic acid 50 mg of γ-lactam of L(+)-6H,7H-cis-7-amino 3-aminomethyl ceph-3-eme -4-carboxylic acid were suspended in 4 cc of iced water. 0.5 cc of an aqueous 10% solution of sodium bicarbonate, and then 5 drops of thienyl-acetyl chloride were added. The reaction mixture was agitated for 5 minutes at ambient temperature, and the same quantity of the bicarbonate solution was added while agitating for another 15 minutes.

The mixture was suction-filtered. The precipitate was washed with water, triturated with methanol, then with ethyl ether. 57 mg (75% yield) of product were obtained, the purity of which was confirmed by thin layer chromatography. Rf 0.62, identical to Rf of the product obtained by hemisynthesis.

The γ-lactam of L(+)-6H,7H-cis-7-(2'-thienylacetamido)-3-aminomethyl-ceph-3-eme-4-carboxylic acid melts above 260°C; $[\alpha]_D^{20} = +145.5 \pm 2.5°$ (c = 1% dimethylformamide).

The I. R. spectrum in nujol can be superimposed on that of the hemisynthetic product.

EXAMPLE 8

Preparation of γ-lactam of DL 6H,7H-cis-7-(4'-nitro-indolyl-3'-acetamido)-3-aminomethyl-ceph-3-eme-4-carboxylic acid A mixture of 40 cc of nitromethane, 1.3 gm of 4-nitro-indolyl-3-acetic acid [J.Org.Chem.,Vol. 31 (1966) p. 70], 0.422 gm of the γ-lactam of DL 6H,7H cis-7-amino-3-aminomethylceph-3-eme-4-carboxylic acid, 0.64 gm of dicyclohexylcarbodiimide and 3 drops of pyridine was stirred overnight and was then vacuum filtered. The precipitate was dissolved in an aqueous solution of sodium bicarbonate and vacuum filtered again. The precipitate was empasted with dimethyl-formamide and the solvent was evaporated under reduced pressure. The residue was taken up in alcohol and the solution was iced and vacuum filtered. The precipitate was washed with ether and dried to obtain 0.733 gm (88% yield) of the γ-lactam of DL 6H,7H cis 7-(4'-nitroindolyl-3'-acetamido)-3-aminomethyl-ceph-3-eme-4-carboxylic acid having a melting point greater than 250°C. The product occurred in the form of yellow crystals soluble in dimethyl formamide and insoluble in alcohol and water.

Anaylysis: $C_{18}H_{15}O_5N_5S$; molecular weight = 413.42: Calculated: C, 52.29%; H, 3.66%; N, 16.94%; S, 7.76%. Found: C, 52.1%; H, 3.8%; N, 16.9%; S, 7.6%.
I R Spectrum:
Presence of bands at 1776, 1690, 1657 and 1537 $cm^{-1}$
Presence of $-NO_2$ at 1507 and 1309 $cm^{-1}$ As far as is known, this compound is not described in the literature.

In an analogous fashion, (5-nitroindolyl-3) acetic acid was condensed with the γ-lactam of DL 6H,7H cis 7-amino-3-aminomethyl-ceph-3-eme-4-carboxylic acid to obtain the γ-lactam of DL 6H, 7H cis 7-(5'-nitro-indolyl-3'-acetamido)-3-aminomethyl-ceph-3-eme-4-carboxylic acid.

As far as is known, this compound is not described in the literature.

EXAMPLE 9

γ-lactam of DL 6H,7H cis 7-(4'-amino-indolyl-3'-acetamido)-3-aminomethyl-ceph-3-eme-4-carboxylic acid. HCl A mixture of 170 mg of Acticarbone charcoal, 1.4 cc of an aqueous solution of 2% palladium chloride and 1.5 cc of water had a current of hydrogen passed therethrough with stirring until there was complete activation of the palladized charcoal. The mixture was vacuum filtered and the solids were washed with water until the wash waters were neutral.

A mixture of 1.5 cc of dimethylformamide, 170 mg of γ-lactam of DL 6H, 7H cis 7-(4'-nitro-indolyl-3'-acetamido)-3-aminomethyl-ceph-3-eme-4-carboxylic acid [obtained from Example 8], 0.49 cc of 1 N hydrochloric acid and the palladized charcoal prepared above was placed in a hydrogen atmosphere and stirred for 1½ hours during which 29.7 cc of hydrogen were absorbed. The hydrogenation was then stopped and the mixture was vacuum filtered. The filter was rinsed with an aqueous solution of 50% ethanol containing 1 drop of hydrochloric acid. The filtrate was distilled under reduced pressure and the residue was taken up in ethanol and the mixture was vacuum filtered. The precipitate was washed with ethanol, then with ether and dried to obtain 123 mg (70% yield) of the hydrochloride of the 65 -lactam of DL 6H, 7H cis 7-(4'-amino-indolyl-3'-acetamido)-3-aminomethyl-ceph-3-eme-4-carboxylic acid melting above 250°C. The product occurred in the form of a colorless solid soluble in water and insoluble in alcohol.

Analysis: $C_{18}H_{18}O_3N_5$ S Cl; molecular weight = 419.90: Calculated: C, 56.38%; H, 4.47%; N, 18.27%; S, 8.36%. Found: C, 56.2%; H, 4.5%; N, 16.%, S, 7.6%.
IR Spectrum:
  Presence of C = O at 1775 cm$^{-1}$
  Absorption complex at 1678 and 1645 cm$^{-1}$
  Presence of aromatic In an analogous fashion, the hydrochloride of the γ-lactam of DL 6H, 7H cis 7-(5'-amino-indolyl-3'-acetamido)-3-aminomethyl-ceph-3-eme-4-carboxylic acid was prepared from the corresponding 5-nitro derivative.

As far as is known, these two compounds are not described in the literature.

EXAMPLE 10

γ-lactam of DL 6H, 7H cis 7-(6'-nitro-indolyl-3'-acetamido)-3-aminomethyl-ceph-3-eme-4-carboxylic acid A mixture of 1.76 gm of (6-nitro-indolyl-3)-acetic acid [described in JACS, Vol. 77, (1955), p. 3839], 920 mg of dicyclohexylcarbodiimide and 10 cc of nitromethane was stirred for 30 minutes and the precipitate formed was recovered by vacuum filtration. The precipitate was empasted with dimethylformamide and the resulting organic solution had added thereto 422 mg of the γ-lactam of DL 6H, 7H cis 7-amino-3-aminomethyl-ceph-3-eme-4-carboxylic acid and was then stirred for 30 minutes. Then, an aqueous solution of 2% sodium bicarbonate was added thereto and the mixture was vacuum filtered. The precipitate was washed with water, dried and taken up in 2.5 cc of dimethylformamide. The solution was heated to 40°C, methanol was added and then was cooled to room temperature. The insolubles were removed by vacuum filtering, were rinsed with methanol, then ether and dried to obtain 820 mg (98% yield) of γ-lactam of DL 6H, 7H cis 7-(6'-nitro-indolyl-3'-acetamido)-3-aminomethyl-ceph-3-eme-4-carboxylic acid melting above 250°C. The product occurred in the form of yellow crystals soluble in dimethylformamide and insoluble in water, methanol and ether.

Analysis: $C_{18}H_{15}O_5N_5S$; molecular weight = 413.42: Calculated: C, 52.3%; H, 3.7%; S, 7.8%; N, 16.9%. Found: C, 53.2%; H, 3.9%; S, 7.4%; N, 16.7–16.8%.
IR Spectrum (Nujol):
  Presence of C = O
  Presence of —NO$_2$ at 1506 and 1339 cm$^{-1}$ As far as is known, this compound is not described in the literature.

EXAMPLE 11

Hydrochloride of the γ-lactam of DL 6H,7H cis 7-(6'-amino-indolyl-3'-acetamido)-3-aminomethyl-ceph-3-eme-4-carboxylic acid Using the procedure of Example 9, the γ-lactam of DL 6H, 7H cis 7-(6'-nitro-indolyl-3'-acetamido)-3-aminomethylceph-3-eme-4- carboxylic acid was reduced to obtain the hydrochloride of the γ-lactam of Dl 6H,7H cis 7-(6'-amino-indolyl-3'-acetamido)-3-aminomethyl-ceph-3-eme-4-carboxylic acid melting above 250°C. The product occurred as a colorless solid soluble in water and insoluble in alcohol.

Analysis: $C_{18}H_{18}O_3N_5S$ Cl; molecular wieght = 419.90: Calculated: C, 54.35%; H, 4.7%; S, 8.06%. Found: 54.4%; H, 4.7%; S, 8.3%.

As far as is known, this compound is not described in the literature.

EXAMPLE 12

γ-lactam of DL 6H,7H cis 7-(7'-nitro-indolyl-3'-acetamido)-3-aminomethyl-ceph-3-eme-4-carboxylic acid Using the procedure of Example 10, (7-nitroindolyl-3)-acetic acid [obtained as in Chem.Ab.,Vol. 59 (1963),p.8855 f] and the γ-lactam of DL 6H,7H cis 7-amino-3-aminomethyl-ceph-3-eme-4-carboxylic acid were reacted to obtain the γ-lactam of DL 6H, 7H cis 7-(7'-nitro-indolyl-3'-acetamido)-3-aminomethylceph-3-eme-4-carboxylic acid melting above 250°C. The product occurred in the form of yellow crystals slightly soluble in most solvents.

Analysis: $C_{18}H_{15}O_5N_5S$; molecular weight = 413.40: Calculated: C, 52.29%; H, 3.66%; N, 16.94% ; S, 7.76%. Found: C, 52.0%; H, 4.0%; N, 16.5%; S, 7.8%.
IR Spectrum:
  Presence of β-lactam at 1779 cm$^{-1}$
  Presence of bands (amide + γ lactam + C = C) at 1703, 1689 and 1658 cm$^{-1}$
  Presence of —NO$_2$ at 1305 cm$^{-1}$ As far as is known, this compound is not described in the literature.

EXAMPLE 13

Hydrochloride of the γ-lactam of DL 6H,7H cis 7-(7'-nitroindolyl-3'-acetamido)-3-aminomethyl-ceph-3-eme-4-carboxylic acid Using the procedure of Example 9, the γ-lactam of DL 6H, 7H cis 7-(7'-nitro-indolyl-3'-acetamido)-3-aminomethylceph-3-eme-4-carboxylic acid was reduced in a 48% yield to the hydrochloride of the γ-lactam of DL 6H, 7H cis 7-(7'-amino-indolyl-3'-acetamido)-3-aminomethyl-ceph-3-eme-4-carboxylic acid melting above 250°C. The product occurred as slightly colored crystals soluble in dimethyl formamide, slightly soluble in chloroform and insoluble in ether and water.

Analysis: $C_{18}H_{17}O_3N_5S$(solvated with 0.75 mol of $CH_3OH$); molecular weight = 407.72: Calculated: C, 55.24%; H, 4.95%; N, 17.18%; S, 7.86%. Found: C, 55.3%; H, 4.6%; N, 16.8%; S, 7.6%.

U. V. Spectrum (0.1N H Cl):
Max. at 219–220 m$\mu$—$E_{1cm}^{1\%}$ = 844
max. at 262 m$\mu$ — $E_{1cm}^{1\%}$ = 194
Inflex. towards 286–287 m$\mu$ — $E_{1cm}^{1\%}$ =99

As far as is known, this compound is not described in the literature.

In an analogous fashion, the γ-lactam of L(+) 6H,7H cis 7-amino-3-aminomethyl-ceph-3-eme-4-carboxylic acid and (7-nitro-indolyl-3)-acetic acid were reacted to obtain the hydrochloride of the γ-lactam of L(+) 6H,7H cis 7-(7'-amino-indolyl-3'-acetamido)-3-aminomethyl-ceph-3-eme-4-carboxylic acid melting above 250°C (with decomposition) and having a specific rotation $[\alpha]_I = +73° \pm 2°$(c = 1% in dimethylformamide).

As fas as is known, this compound is not described in the literature.

EXAMPLE 14

γ-lactam of DL 6H, 7H - cis 7-(4'-p-nitrophenyl syndone-3'-acetamido)-3-aminomethyl-ceph-3-eme-4-carboxylic acid Step A: α-ethoxy-carbonylmethylamino p-nitrophenyl-acetic acid A mixture of 13 gm of α-bromo-p-nitrophenylacetic acid [obtained by the process described in Annalen, Vol. 611, p. 40], 35 gm of the hydrochloride of ethyl glycocollate and 35 cc of water was stirred at an interior temperature of 0°C and then 35 cc of 10 N sodium hydroxide solution were added over 15 minutes with agitation and allowing the mixture to warm to room temperature in 30 minutes. The mixture was cooled to 0°C and 18 cc of acetic acid were added thereto. The mixture was vacuum filtered and the precipitate was washed with water. Five volumes of 1 N hydrochloric acid were added thereto and the mixture was vacuum filtered. The precipitate was rinsed with 0.1 N hydrochloric acid, then with water and the filtrate was adjusted to a pH of 7–8 by the addition pyridine, was iced for 15 minutes and was vacuum filtered. The precipitate was washed with water to obtain 2.8 gm of α-ethoxycarbonyl-methylamino-p-nitrophenyl acetic acid melting at 170°C. The product occurred as colorless crystals soluble in dilute aqueous acids and alkalis and insoluble in ether and water.

Analysis: $C_{12}H_{14}O_6N_2$; molecular weight = 282.25: Calculated: C, 51.1 %; H 5.0%; N 9.9%. Found C, 51.3%; H, 4.8%; N, 10.1%.

IR Spectrum (Nujol):
Bands at 1751, 1718, 1651, 1605, 1565, 1517 and 1348 cm$^{-1}$ The product was in the form of an internal salt. As far as is known, this compound is not described in the literature.

Step B: α-(p-nitrophenyl)imino diacetic acid 14.1 gm of the product of Step A in 75 cc of 2N sodium hydroxide solution was stirred for 1 hour at room temperature and then 17 cc of 10 N hydrochloric acid were added thereto and the mixture was evaporated to dryness under reduced pressure. The residue was taken up in 7.5 cc of pyridine and after the addition of 100 cc of ethanol, the mixture was iced for 15 minutes and vacuum filtered. The precipitate was washed with ethanol and then ether to obtain 18.9 gm of raw acid. 23 gm of raw product were dissolved in 100 cc ethanol containing 8.5 cc of 10 N hydrochloric acid and the mixture waw vacuum filtered. The precipitate was washed with ethanol and 15 cc of pyridine were added to the filtrate with stirring and the mixture was iced for 15 minutes and vacuum filtered. The precipitate was washed with ethanol, then ether to obtain 10 gm of α-(p-nitrophenyl) imino-diacetic acid in the form of its internal salt. The product occurred as colorless crystals solvated with 15% pyridine and was soluble in water and dilute aqueous acids and alkalis, slightly soluble in ethanol and insoluble in ether.

Analysis: $C_{10}H_{10}O_6N_2$; molecular weight = 254.20. Calculated; C 51.1%; H, 4.3%; N, 12.0%. Found: C 51.2–51.5%; H, 4.2–4.6%; N, 11.4–11.5%.

IR Spectrum (Nujol):
Presence of aromatic, $-NO_2$ and C=O at 1733 cm$^{-1}$ and of associated OH, NH.

The acid was in the form of an internal salt.

As far as is known, this compound is not described in the literature.

Step C: DL 4-(p-nitrophenyl) sydnone-3-acetic acid

A mixture of 10.2 gm of α-(p-nitrophenyl)imino-diacetic acid and 22 cc of 2N hydrochloric acid was cooled to an interior temperature of 10°C and a solution of 2.9 gm of sodium nitrate in 6 cc of water was added thereto. The mixture was stirred for 45 minutes at room temperature and was extracted with methyl acetate and was salted out with sodium chloride. The organic phases were dried over sodium sulfate and vacuum filtered. The filter was washed with methyl acetate and the filtrate was evaporated to dryness. The raw N-nitroso-α-(p-nitrophenyl) imino diacetic acid was dissolved in 60 cc of anhydrous acetic acid and the solution was stirred for 3 hours at room temperature. 20 cc of water were added to the solution and allowed to remain in contact therewith for 30 minutes and then the mixture was evaporated to dryness under reduced pressure. The residue was taken up in 50 cc of an aqueous solution of 10% sodium bicarbonate and the mixture was vacuum filtered and the filter was washed with aqueous 2% sodium bicarbonate solution and then with water. The pH of the filtrate was adjusted to 1 by the addition of 10 N hydrochloric acid and the filtrate was iced for 15 minutes and then was vacuum filtered. The precipitate was washed with water to obtain 5.7 gm (54% yield) of DL 4-(p-nitrophenyl)-sydnone-3-acetic acid melting at 220°C (decomp.). The product occurred as a yellow solid soluble in weak bases and dimethylformamide and insoluble in water, ether and aqueous acids.

Analysis: $C_{10}H_7O_6N_3$; molecular weight = 265.18: Calculated: C, 42.4%; H, 3.2%; N, 14.8%. Found: C, 42.3%; H, 3.0%; N, 14.9%.

IR Spectrum (Nujol):
Presence of C = O at 1738 and 1713 cm$^{-1}$
Presence of C = C, C = N, $NO_2$ and phenyl at 1642, 1598 and 1515 cm$^{-1}$ As far as is known, this compound is not described in the literature.

Step D: γ-lactam of DL 6H, 7H cis 7-(4'-p-nitrophenyl-sydnone-3'-acetamido)-3-aminomethyl-ceph-3-eme-4-carboxylic acid A mixture of 2.12 gm of DL 4-(p-nitrophenyl)sydnone-3-acetic acid, 3 gm of dicyclohexyldicarbodiimide, 20 cc of nitromethane, 422 mg of γ-lactam of DL 6H, 7H cis 7-amino-3-aminomethyl-ceph-3-eme-4-carboxylic acid and 0.2 cc of pyridine was stirred at room temperature for 16 hours and was then vacuum filtered. The precipitate was washed with nitromethane, then with ether to obtain 3.14 gm of raw γ-lactam. The raw product was taken up in 15 cc of dimethylformamide and was vacuum filtered. The product was washed with dimethylformamide and 90 cc of water were added to the filtrate which was vacuum filtered. The precipitate was washed with water to obtain 0.74 gm of γ-lactam of DL, 6H, 7H cis 7-(4'-p-nitrophenyl-sydnone-3'-acetamido)-3-aminomethyl-ceph-3-eme-4-carboxylic acid in the form of yellow crystals soluble in dimethylformamide and insoluble in water, ether and nitromethane.

Analysis: $C_{18}H_{14}O_7N_6S$; molecular weight = 458.40: Calculated: C, 47.2%; H, 3.1%; N, 18.3%; S, 7.0%. Found: C, 47.4%; H, 3.5%; N, 17.9%; 6.8%.

IR Spectrum (Nujol):
Presence of NH at 3310 cm$^{-1}$
Presence of β-lactam at 1787 cm$^{-1}$
Presence of C = O and C = C at 1733, 1710, 1686 and 1658cm$^{-1}$
Presence of aromatic + NO$_2$ + NH at 1600, 1593 and 1519 cm$^{-1}$ As far as is known, this compound is not described in the literature.

EXAMPLE 15

γ-lactam of DL 6H.7H cis 7-(4'-p-aminophenyl-sydnone-3'-acetamido)-3-aminomethyl-ceph-3-eme-4-carboxylic acid A mixture of 350 mg of activated carbon, 3.5 cc of an aqueous solution of 2% palladium chloride and 3.5 cc of water was stirred under a hydrogen atmosphere for 30 minutes at room temperature and vaccum filtering, the carbon was washed with water until the wash waters were neutral.

A mixture of 680 mg of the γ-lactam of DL 6H, 7H cis 7-(4'-p-nitrophenyl-sydnone-3'-acetamido)-3-aminomethyl-ceph-3-eme-4-carboxylic acid [obtained in Example 14], 6 cc of dimethylformamide, 1.5 cc of N hydrochloric acid and the palladized carbon prepared above was stirred under a hydrogen atmosphere for 40 minutes at 30°C. The catalyst was removed by filtration and the filter was washed with water. The filtrate was evaporated to dryness under reduced pressure and the residue was taken up in 0.2 cc of pyridine and then in 10 cc of ethanol. After vacuum filtration, the precipitate was washed with ethanol to obtain 235 mg of the γ-lactam of DL 6H. 7H cis 7-(4'-aminophenyl)-sydnone-3'-acetamido)-3-aminomethyl-ceph-3-eme-4-carboxylic acid with the form of colorless crystals soluble in dilute aqueous acids and dimethyl formamide, slightly soluble in ethanol and insoluble in water.

Analysis: $C_{18}H_{16}O_5N_6S$; molecular weight = 428.42: Calculated: C, 50.4%; H, 3.8%; N, 19.6%; S, 7.5%. Found: C, 50.3%; H, 4.2%; N, 19.3%; S, 6.9%.

IR Spectrum (nujol):
Presence of β-lactam at 1777 cm$^{-1}$

As far as is known, this compound is not described in the literature.

EXAMPLE 16

γ-lactam of DL 6H 7H cis 7-(4'-m-nitrophenyl-sydnone-3'-acetamido)-3-aminomethyl-ceph-3-eme-4-carboxylic acid Step A:

A mixture of 13 gm of the hydrochloride of ethyl glycocollate, 6.5 gm of potassium cyanide, 15 gm of m-nitrobenzaldehyde, 130 cc of ethyl acetate and 13 cc of water was stirred for 24 hours at room temperature and the organic phase was decanted off, was dried over magnesium sulfate and was vacuum filtered. The filter was washed with ethyl acetate and the filtrate was evaporated to dryness under reduced pressure to obtain 24 gm of raw hydrochloride salt which was purified by chromatography through silica gel and elution with an 8–2 mixture of chloroform and ethyl acetate. The product was precipitated from ether with gaseous hydrogen chloride to obtain 18 gm of hydrochloride of ethyl N-(α-m-nitrophenyl α-nitromethyl)-glycocollate.

For analysis, 1 gm of the product was dissolved in 4 cc of hot ethanol, was vacuum filtered, cooled, vacuum filtered washed with ethanol and ether to obtain 530 mg of the pure hydrochloride salt in the form of yellow crystals soluble in water and insoluble in ether.

Analysis: $C_{12}H_{14}O_4N_3Cl$; molecular weight = 299.71: Calculated: C, 48.1%; H, 4.7%; N, 14.0%; Cl, 11.8%. Found: C, 49.1%; H, 4.7%; N, 14.0%; Cl, 10.5%.

IR Spectrum (Nujol);
Presence of C = O ester at 1745cm$^{-1}$ and aromatic and NO$_2$ As far as is known, this compound is not described in the literature.

Step B:

A mixture of 3 gm of the hydrochloride of ethyl N-(α-m-nitrophenyl α-nitromethyl)-glycocollate, 7.5 cc of water and 7.5 cc of 10 N hydrochloric acid was refluxed for 16 hours and after cooling the solution, 150 cc of acetone were added thereto. The mixture was iced for 30 minutes and the vacuum filtered. The filter was washed with acetone and the filtrate was evaporated to dryness under reduced pressure. The residue was taken up in acetone and iced for 1 hour and then vacuum filtered. The precipitate was washed with acetone to obtain 1.64 gm of the hydrochloride of α-(m-nitrophenyl)-imino-diacetic acid in the form of colorless crystals soluble in water and alcohol and insoluble in acetone and ether.

For analysis, 1.6 gm of the hydrochloride salt were dissolved in 8 cc of ethanol and was vacuum filtered. After washing the filter with ethanol, the pH of the filtrate was adjusted to 7–8 by addition of pyridine and the mixture was iced for 15 minutes and vacuum filtered. The precipitate was washed with ethanol and then ether to obtain 1g of the free acid in the form of its internal salt. The product occurred as colorless crystals soluble in water and dilute bases and acids.

Analysis: $C_{10}H_{10}N_2O_6$; molecular weight = 254.20 (20% of pyridine): Calculated: C, 53.1%; H, 4.5%; N, 12.4%. Found: C, 53.0–53.2%; H, 4.5–4.6%; N, 12.1%.

IR Spectrum (Nujol):
Presence of C = O at 1730cm$^{-1}$ and presence of aromatic, NO$_2$ and OH, NH associated and carboxyl.

As far as is known, this compound is not described in the literature.

Step C: A mixture of 29 gm of hydrochloride of α-(m-nitrophenyl)imino-diacetic acid and 60 cc of water was admixed with a solution of 8.3 gm of sodium nitrite in 15 cc of water and the mixture was stirred for 30 minutes at room temperature. After salting out with sodium chloride and extraction with methyl acetate, the organic phases were dried over sodium sulfate, vacuum filtered and the filter was washed with methyl acetate. The filtrate was evaporated to dryness under reduced pressure to obtain a quantitative yield of raw N-nitroso-α-(m-nitrophenyl)-imino-diacetic acid. The residue was dissolved in 120 cc of acetic acid anhydride and the solution was stirred for 3 hours at room temperature. 40 cc of water were added to the solution and the mixture was allowed to stand for 30 minutes and was then evaporated to dryness under reduced pressure. The residue was extracted with 100 cc of a 10% sodium bicarbonate aqueous solution and the mixture was vacuum filtered and the filter was washed with sodium bicarbonate solution and then with water. The pH of the filtrate was adjusted to 1 by the addition of 10 N hydrochloric acid and was vacuum filtered. The precipitate was washed with water and then with ether to obtain 13.5 gm of DL 4-(m-nitrophenyl) syndone-3-acetic acid melting at 220°C (decomp.). The product occurred in the form of yellow crystals soluble in weak bases and dimethylformamide and insoluble in water, ether and aqueous acids.

Analysis: $C_{10}H_7O_6N_3$; molecular weight = 265.18. Calculated: C, 45.3%; H, 2.7%; N, 15.8%. Found: C, 45.3%; H, 2.5%; N, 15.5%.

IR Spectrum (chloroform):
Presence of aromatic, $NO_2$ C = O and CH band

As far as is known, this compound is not described in the literature.

STEP D: A mixture of 2.12 gm of DL 4-(m-nitrophenyl) syndone-3-acetic acid, 1 gm of dicyclohexyldicarbodiimide, 20 cc of nitromethane, 422 mg of the γ-lactam of DL 6H, 7H cis 7-amino-3-aminomethyl-ceph-3-eme-4-carboxylic acid and 0.2 cc of pyridine was stirred for 16 hours at room temperature and was vacuum filtered. The filter was washed with nitromethane and then ether to obtain 1.65 gm of raw γ-lactam which was purified by suspending it in 6.5 cc of dimethylformamide and vacuum filtering the mixture. The filter was washed with dimethylformamide and then 20 cc of water were added to the filtrate which was iced for 15 minutes and then vacuum filtered. The precipitate was washed with water, then with ether to obtain 380 mg of the γ-lactam of DL 6H, 7H cis 7-(4'-m-nitrophenyl-sydnone-3'-acetamido)-3-aminomethyl-ceph-3-eme-4-carboxylic acid in the form of colorless crystals soluble in dimethylformamide and insoluble in water.

Analysis: $C_{18}H_{14}O_7N_6S$; molecular weight = 458.40. Calculated: C, 47.2%; H, 3.1%; N, 18.3%; S, 7.0%. Found: C, 47.5%; H, 3.3%; N, 18.0%; S, 7.2%.

IR Spectrum (Nujol):
Presence of β-lactam, secondary amide, $NO_2$ and sydnone

As far as is known, this compound is not described in the literature.

EXAMPLE 17

γ-lactam of DL 6H, 7H cis
7-(4'-m-aminophenyl-sydnone-3'-acetamido)-3-aminomethyl-ceph-3-eme-4-carboxylic acid A mixture of 200 mg of activated carbon, 2 cc of an aqueous 2% palladium chloride solution and 2 cc of water was stirred at room temperature under a hydrogen atmosphere until reduction of the palladium was complete and the activated carbon was recovered by vacuum filtration and was washed with water until the wash waters were neutral. The palladized carbon suspended in 4 cc of dimethyl formamide together with 383 mg of γ-lactam of DL 6H, 7H cis-7-(4'-m-nitrophenyl-sydnone-3'-acetamido)-3-aminomethyl-ceph-3-eme-4-carboxylic acid and 0.85 cc of N hydrochloric acid was stirred under a hydrogen atmosphere at 30°C for 30 minutes and the catalyst was removed by vacuum filtration. The filter was washed with water and the filtrate was evaporated to dryness under reduced pressure. The residue was taken up in 0.2 cc of pyridine and after the addition of 6 cc of ethanol, the mixture was iced for 15 minutes and then was vacuum filtered. The precipitate was washed with ethanol to obtain 153 mg of the γ-lactam of DL 6H, 7H cis 7-(4'-m-aminophenyl-sydnone-3'-acetamido)-3-aminomethyl-ceph-3-eme-4-carboxylic acid in the form of colorless crystals soluble in aqueous acids and dimethylformamide, slightly soluble in alcohol and insoluble in water.

Analysis: $C_{18}H_{16}O_5N_6S$; molecular weight = 428.42: Calculated: C, 49.6%; H, 4.3%; N, 18.2%; S, 6.9%. Found: C, 49.6%; H, 4.15%; N, 18.2%; S, 6.7%.

IR Spectrum (Nujol):
Presence of β-lactam at 1783 $cm^{-1}$

As far as is known, this compound is not described in the literature.

EXAMPLE 18

γ-lactam of DL 6H, 7H cis
7-(sydnone-3'-acetamido)-3-aminomethyl-ceph-3-eme-4-carboxylic acid A mixture of 575 mg of sydnone-3-acetic acid [described in Chem. Ind. 1961, p. 141], 500 mg of dicyclohexylcarbodiimide, 211 mg of the γ-lactam of DL 6H, 7H cis 7-amino-3-aminomethyl-ceph-3-eme-4-carboxylic acid, 5 cc of nitromethane and a drop of pyridine was stirred overnight at 25°C and was then vacuum filtered. The filter was washed with nitromethane and the precipitate was empasted with dimethyl formamide and the dimethylformamide solution was concentrated to a small volume under vacuum. The precipitate was taken up in methanol and was vacuum filtered. The precipitate was rinsed with methanol and then with ether and dried to obtain 190 mg of raw product. The product was taken up in 0.4 cc of dimethylformamide and after the addition of 2 cc of methanol, the mixture was vacuum filtered. The precipitate was washed with methanol, then ether and dried to obtain 160 mg of the γ-lactam of DL 6H, 7H cis 7-(sydnone-3'-acetamido)-3-aminomethyl-ceph-3-eme-4-carboxylic acid melting above 250°C. The product occurred as colorless crystals soluble in dimethylformamide and insoluble in water, methanol and ether.

Analysis: $C_{12}H_{11}O_5N_5S$; molecular weight = 337.31: Calculated: C, 42.7%; H, 3.3%; N, 20.8%; S, 9.5%. Found: C, 42.4%; H, 3.6%; N, 20.7%; S, 9.6%.

IR Spectrum (Nujol):
Presence of β-lactam at 1788 $cm^{-1}$, of C = O sydnone at 1725 $cm^{-1}$, of C = O amide at 1697 $cm^{-1}$ and amide at 1562 and 1555 $cm^{-1}$.

As far as is known, this compound is not described in the literature.

EXAMPLE 19

γ-lactam of DL 6H, 7H cis 7-(4'-phenyl-sydnone-3'-acetamido)-3-aminomethyl-ceph-3-eme-4-carboxylic acid Using the procedure of Example 14, 4-phenyl-sydnone-3-acetic acid [prepared by the process of Stewart, J. Chem. Soc., 1963, -p 701] and the γ-lactam of DL 6H, 7H cis 7-amino-3-aminomethyl-ceph-3-eme-4-carboxylic acid were reacted to obtain a 40% yield of the γ-lactam of DL 6H, 7H cis 7-(4-phenyl-sydnone-3'-acetamido)-3-aminomethyl-ceph-3-eme-4-carboxylic acid melting above 250°C. The product occurred in the form of colorless crystals soluble in dimethylformamide and insoluble in water, ether and methanol.

Analysis: $C_{18}H_{15}O_5N_5S$; molecular weight = 413.40:
Calculated: C, 52.3%; H, 3.7%; N, 16.9%; S, 7.8%.
Found: C, 52.1%; H, 3.8%; N, 16.6%; S, 7.7%.

IR Spectrum (Nujol):
Presence of β-lactam at 1779 $cm^{-1}$, of sydnone at 1736 $cm^{-1}$ and amide at 1522 $cm^{-1}$.

As far as it is known, this compound is not described in the literature.

PHARMACOLOGICAL DATA

Antibacterial Activity in Vitro

The minimum inhibiting concentration (MIC) for the compounds of the invention was determined in a liquid medium of Oxoid No. 2 with a pH of 7.3 after 24 hours and 48 hours incubation at 37°C with respect to various staphylococcus using increasing dosages. The bacteriostatic effect was determined in the presence of serum. The results are reported in the following tables.

γ-lactam of 6H, 7H cis 7-(4'-p-nitrophenyl-sydnone-3'-acetamido)-3-aminomethyl-ceph-3-eme-4-carboxylic acid.

| Strain | M.I.C. in γ/cc 24 hours | 48 hours |
|---|---|---|
| Staphylococcus no. 1061 | 2.5 | 5 |
| Staphylococcus No. 1061 in presence 5% of albumin | >5 | >5 |
| Staphylococcus No. 1128 penicillin resistant | 5 | 10 |

γ-lactam of DL 6H, 7H cis 7-(4'-p-aminophenyl-sydnone-3'-acetamido)-3-aminomethyl-ceph-3-eme-4-carboxylic acid

| Strain | M.I.C. in γ/3cc 24 hours | 48 hours |
|---|---|---|
| Staphylococcus no. 1061 | 1 | 2.5 |
| Staphylococcus no. 1061 in presence of 5% of albumin | 1 | 2.5 |
| Staphylococcus no. 1128 penicillin resistant | 1 | 2.5 |
| Gram negative germ | >50 | >50 |

γ-lactam of DL 6H, 7H cis 7-(4'-m-nitrophenyl-sydnone-3'-acetamido)-3-aminomethyl-ceph-3-eme-4-carboxylic acid

| Strain | M.I.C. in γ/cc 24 hours | 48 hours |
|---|---|---|
| Staphylococcus No. 1061 | 2.5 | 5 |
| Staphylococcus no. 1061 in presence of 5% of albumin | >5 | >5 |
| Staphylococcus penicillin resistant | 2.5 | 5 |

γ-lactam of DL 6H, 7H cis 7-(4'-m-aminophenyl-sydnone-3'-acetamido)-3-aminomethyl-ceph-3-eme-4-carboxylic acid

| Strain | M.I.C. in γ/cc 24 hours | 48 hours |
|---|---|---|
| Staphylococcus no. 1061 | 0.5 | 1 |
| Staphylococcus no. 1061 in presence of 5% of albumin | 1 | 2.5 |
| Staphylococcus no. 1128 penicillin resistant | 1 | 2.5 |
| Gram negative germ | >50 | >50 |

γ-lactam of DL 6H 7H cis 7-(4'-phenyl-sydnone-3'-acetamido)-3-aminomethyl-ceph-3-eme-4-carboxylic acid

| Strain | M.I.C. in γ/cc 24 hours | 48 hours |
|---|---|---|
| Staphylococcus Oxford no. 1061 | 0.10 | 0.25 |
| Staphylococcus Oxford in presence of serum | 0.10 | 0.25 |
| Staphylococcus no. 1128, penicillin resistant | 0.25 | 0.50 |

γ-lactam of DL 6H, 7H cis 7-(4'-nitro indolyl-3'-acetamido)-3-aminomethyl ceph-3-eme 4-carboxylic acid

| Strain | M.I.C. in γ/cc 24 hours | 48 hours |
|---|---|---|
| Staphylococcus Oxford no. 1061 | 0.5–1 | 1–2.5 |
| Staphylococcus Oxford in presence of serum | 1–2.5 | 2.5–5 |
| Staphylococcus penicillin resistant no. 1128 | 1–2.5 | 2.5–5 |

Hydrochloride of γ-lactam of DL 6H, 7H cis 7-(4'-amino indolyl-3'acetamido)-3-aminomethyl ceph-3-eme-4-carboxylic acid

| Strain | MIC in γ/cc 24 hours | 48 hours |
|---|---|---|
| Staphylococcus Oxford no. 1061 | 1–2.5 | 2.5–5 |
| Staphylococcus Oxford in presence of serum | 2.5–5 | >5 |

γ-lactam of DL 6H, 7H cis 7-(6'-nitro-indolyl-3'-acetamido)-3-aminomethyl-ceph-3-eme-4-carboxylic acid

| Strain | MIC in γ/cc 24 hours | 48 hours |
|---|---|---|
| Staphylococcus Oxford no. 1061 | 0.25–0.5 | 0.25–0.50 |
| Staphylococcus Oxford in presence of Serum | 2.50–5 | >5 |
| Staphylococcus penicillin resistant no. 1128 | 0.25–0.5 | 0.50–1.0 |

Hydrochloride of the γ-lactam of DL 6H, 7H cis 7-(6'amino indolyl-3-acetamido)-3-aminomethyl-ceph-3-eme-4-carboxylic acid

| Strain | MIC in γ/cc 24 hours | 48 hours |
|---|---|---|
| Staphylococcus Oxford No. 1061 | 1–2.5 | 2.5–5 |
| Staphylococcus Oxford in presence of serum | 1–2.5 | 2.5–5 |

γ-lactam of DL 6H, 7H cis 7-(7'-nitro-indolyl-3'-acetamido)-3-aminomethyl-ceph-3-eme-4-carboxylic acid

| Strain | MIC in γ/cc | |
|---|---|---|
| | 24 hours | 48 hours |
| Staphylococcus Oxford no. 1061 | 0.25–0.5 | 0.50–1 |
| Staphylococcus Oxford in presence of serum | 2.5–5 | >5 |
| Staphylococcus penicillin resistant no. 1128 | 0.25–0.5 | 0.50–1 |

Hydrochloride of γ-lactam of DL 6H, 7H cis 7-(7'-amino-indolyl-3'-acetamido)-3-aminomethyl-ceph-3-eme-4-carboxylic acid

| Strain | MIC in γ/cc | |
|---|---|---|
| | 24 hours | 48 hours |
| Staphylococcus Oxford no. 1061 | 0.5–1 | 1–2.5 |
| Staphylococcus Oxford in presence of serum | 0.5–1 | 2.5–5 |
| Staphylococcus penicillin resistant no. 1128 | 0.5–1 | 0.5–1 |

Various modifications of the process and positions of the invention may be made without departing from the spirit or scope thereof and it is to be understood that the invention is intended to be limited only as defined in the appended claims.

We claim:
1. A 1,3-thiazine compound having the formula

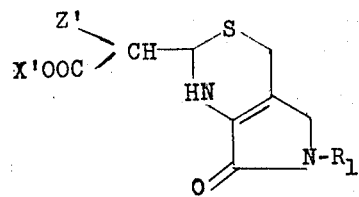

wherein X' is selected from the group consisting of hydrogen, lower alkyl and phenyl lower alkyl, $R_1$ is selected from the group consisting of hydrogen, lower alkyl, phenyl, phenyl lower alkyl, lower alkyl phenyl and lower alkoxy phenyl, and Z' is selected from the group consisting of amino and tritylamio.

2. The product of claim 1 wherein $R_1$ is hydrogen, Z' is amino and X' is t-butyl and its hydrochloride.

3. The product of claim 1 wherein $R_1$ is hydrogen, Z' is amino and X' is hydrogen.

4. The product of claim 1 wherein $R_1$ is hydrogen, Z' is tritylamino and X' is hydrogen.

* * * * *